(12) United States Patent
Swift

(10) Patent No.: US 9,309,436 B2
(45) Date of Patent: Apr. 12, 2016

(54) COMPOSITE MAILLARD-RESOLE BINDERS

(71) Applicants: Knauf Insulation, Inc., Shelbyville, IN (US); Knauf Insulation SPRL, Visé (BE)

(72) Inventor: Brian L. Swift, Oxford, GA (US)

(73) Assignees: Knauf Insulation, Inc., Shelbyville, IN (US); Knauf Insulation SPRL, Vise (BE)

(*) Notice: Subject to any disclaimer, the term of this patent is extended or adjusted under 35 U.S.C. 154(b) by 0 days.

(21) Appl. No.: 14/041,015

(22) Filed: Sep. 30, 2013

(65) Prior Publication Data

US 2014/0088225 A1    Mar. 27, 2014

Related U.S. Application Data

(62) Division of application No. 12/595,753, filed as application No. PCT/US2008/059730 on Apr. 9, 2008, now Pat. No. 8,552,140.

(60) Provisional application No. 60/911,625, filed on Apr. 13, 2007.

(51) Int. Cl.

| C09D 161/34 | (2006.01) |
| C09D 161/06 | (2006.01) |
| C08J 5/04 | (2006.01) |
| D04H 1/587 | (2012.01) |
| D04H 1/64 | (2012.01) |
| C08L 3/02 | (2006.01) |
| C08H 1/00 | (2006.01) |
| C08L 97/02 | (2006.01) |
| C09J 161/34 | (2006.01) |
| C08L 61/34 | (2006.01) |
| C08K 7/14 | (2006.01) |

(52) U.S. Cl.

CPC .............. C09D 161/06 (2013.01); C08H 1/00 (2013.01); C08J 5/04 (2013.01); C08L 3/02 (2013.01); C08L 61/34 (2013.01); C08L 97/02 (2013.01); C09J 161/34 (2013.01); D04H 1/587 (2013.01); D04H 1/641 (2013.01); C08J 2301/02 (2013.01); C08J 2361/06 (2013.01); C08K 7/14 (2013.01); C08L 2205/16 (2013.01)

(58) Field of Classification Search

CPC ......... C08J 5/04; C08J 2361/06; C08L 97/02; C08L 61/34; C09J 161/34
USPC ....................... 524/58; 264/109; 528/161, 162
See application file for complete search history.

(56) References Cited

U.S. PATENT DOCUMENTS

| 1,801,052 A | 4/1931 | Meigs |
| 1,801,053 A | 4/1931 | Meigs |
| 1,886,353 A | 11/1932 | Novotny |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,231,349 A | 1/1966 | Stalego |
| 3,232,821 A | 2/1966 | Banks |
| 3,297,419 A | 1/1967 | Eyre |
| 3,513,001 A | 5/1970 | Woodhead |
| 3,551,365 A | 12/1970 | Matalon |
| 3,791,807 A | 2/1974 | Etzel |
| 3,802,897 A | 4/1974 | Bovier |
| 3,809,664 A | 5/1974 | Burr |
| 3,826,767 A | 7/1974 | Hoover |
| 3,856,606 A | 12/1974 | Fan |
| 3,867,119 A | 2/1975 | Kasuga |
| 3,907,724 A | 9/1975 | Higginbottom |
| 3,911,048 A | 10/1975 | Nistri |
| 3,919,134 A | 11/1975 | Higginbottom |
| 3,922,466 A | 11/1975 | Bell |
| 3,956,204 A | 5/1976 | Higginbottom |
| 3,961,081 A | 6/1976 | McKenzie |
| 3,971,807 A | 7/1976 | Brack |
| 4,014,726 A * | 3/1977 | Fargo ............................ 156/167 |

(Continued)

FOREIGN PATENT DOCUMENTS

| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.
International Search Report and Written Opinion for PCT/US2008/069046, completed Sep. 25, 2008.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update, "Chemistry & Industry, No. 17, 1988, 4 pages.

(Continued)

*Primary Examiner* — Liam J Heincer
*Assistant Examiner* — Nicholas Hill
(74) *Attorney, Agent, or Firm* — Knauf Insulations, Inc.; James K. Blodgett

(57) ABSTRACT

Composite Maillard-resole binders to produce or promote cohesion in non-assembled or loosely assembled matter.

15 Claims, 3 Drawing Sheets

(56) References Cited

U.S. PATENT DOCUMENTS

| | | | |
|---|---|---|---|
| 4,028,290 A | 6/1977 | Reid | |
| 4,048,127 A | 9/1977 | Gibbons | |
| 4,054,713 A | 10/1977 | Sakaguchi | |
| 4,085,076 A | 4/1978 | Gibbons | |
| 4,097,427 A | 6/1978 | Aitken | |
| 4,107,379 A | 8/1978 | Stofko | |
| 4,109,057 A * | 8/1978 | Nakamura et al. | 428/528 |
| 4,144,027 A | 3/1979 | Habib | |
| 4,148,765 A | 4/1979 | Nelson | |
| 4,183,997 A | 1/1980 | Stofko | |
| 4,184,986 A | 1/1980 | Krasnobajew | |
| 4,186,053 A | 1/1980 | Krasnobajew | |
| 4,201,857 A | 5/1980 | Krasnobajew | |
| 4,233,432 A | 11/1980 | Curtis, Jr. | |
| 4,246,367 A | 1/1981 | Curtis, Jr. | |
| 4,259,190 A | 3/1981 | Fahey | |
| 4,265,963 A | 5/1981 | Matalon | |
| 4,278,573 A | 7/1981 | Tessler | |
| 4,296,173 A | 10/1981 | Fahey | |
| 4,301,310 A | 11/1981 | Wagner | |
| 4,310,585 A | 1/1982 | Shannon | |
| 4,322,523 A | 3/1982 | Wagner | |
| 4,330,443 A | 5/1982 | Rankin | |
| 4,333,484 A | 6/1982 | Keritsis | |
| 4,357,194 A | 11/1982 | Stofko | |
| 4,361,588 A | 11/1982 | Herz | |
| 4,379,101 A | 4/1983 | Smith | |
| 4,393,019 A | 7/1983 | Geimer | |
| 4,396,430 A | 8/1983 | Matalon | |
| 4,400,496 A | 8/1983 | Butler | |
| 4,464,523 A | 8/1984 | Neigel | |
| 4,506,684 A | 3/1985 | Keritsis | |
| 4,520,143 A | 5/1985 | Jellinek | |
| 4,524,164 A | 6/1985 | Viswanathan | |
| 4,631,226 A | 12/1986 | Jellinek | |
| 4,668,716 A | 5/1987 | Pepe et al. | |
| 4,692,478 A | 9/1987 | Viswanathan | |
| 4,714,727 A | 12/1987 | Hume, III | |
| 4,720,295 A | 1/1988 | Bronshtein | |
| 4,754,056 A | 6/1988 | Ansel | |
| 4,761,184 A | 8/1988 | Markessini | |
| 4,780,339 A | 10/1988 | Lacourse | |
| 4,828,643 A | 5/1989 | Newman | |
| 4,845,162 A | 7/1989 | Schmitt | |
| 4,906,237 A | 3/1990 | Johansson | |
| 4,912,147 A | 3/1990 | Pfoehler | |
| 4,918,861 A | 4/1990 | Carpenter | |
| 4,923,980 A | 5/1990 | Blomberg | |
| 4,950,444 A | 8/1990 | Deboufie | |
| 4,988,780 A | 1/1991 | Das | |
| 4,992,519 A | 2/1991 | Mukherjee | |
| 5,001,202 A | 3/1991 | Denis | |
| 5,013,405 A | 5/1991 | Izard | |
| 5,037,930 A | 8/1991 | Shih | |
| 5,041,595 A | 8/1991 | Yang | |
| 5,089,342 A | 2/1992 | Dhein | |
| 5,095,054 A | 3/1992 | Lay | |
| 5,106,615 A | 4/1992 | Dikstein | |
| 5,114,004 A | 5/1992 | Isono | |
| 5,123,949 A | 6/1992 | Thiessen | |
| 5,124,369 A | 6/1992 | Vandichel | |
| 5,128,407 A | 7/1992 | Layton | |
| 5,143,582 A | 9/1992 | Arkens | |
| 5,151,465 A | 9/1992 | Le-Khac | |
| 5,167,738 A | 12/1992 | Bichot | |
| 5,198,492 A | 3/1993 | Stack | |
| 5,217,741 A | 6/1993 | Kawachi | |
| 5,218,048 A | 6/1993 | Abe | |
| 5,240,498 A | 8/1993 | Matalon | |
| 5,278,222 A | 1/1994 | Stack | |
| 5,300,144 A | 4/1994 | Adams | |
| 5,300,192 A | 4/1994 | Hansen | |
| 5,308,896 A | 5/1994 | Hansen | |
| 5,318,990 A | 6/1994 | Strauss | |
| 5,336,753 A | 8/1994 | Jung | |
| 5,336,755 A | 8/1994 | Pape | |
| 5,336,766 A | 8/1994 | Koga | |
| 5,340,868 A | 8/1994 | Strauss | |
| 5,352,480 A | 10/1994 | Hansen | |
| 5,371,194 A | 12/1994 | Ferretti | |
| 5,387,665 A | 2/1995 | Misawa | |
| 5,389,716 A | 2/1995 | Graves | |
| 5,393,849 A | 2/1995 | Srinivasan | |
| 5,416,139 A | 5/1995 | Zeiszler | |
| 5,421,838 A | 6/1995 | Gosset | |
| 5,424,418 A | 6/1995 | Duflot | |
| 5,434,233 A | 7/1995 | Kiely | |
| 5,447,977 A | 9/1995 | Hansen | |
| 5,470,843 A | 11/1995 | Stahl | |
| 5,480,973 A | 1/1996 | Goodlad | |
| 5,492,756 A | 2/1996 | Seale | |
| 5,498,662 A | 3/1996 | Tanaka | |
| 5,534,612 A | 7/1996 | Taylor | |
| 5,536,766 A | 7/1996 | Seyffer | |
| 5,538,783 A | 7/1996 | Hansen | |
| 5,543,215 A | 8/1996 | Hansen | |
| 5,545,279 A | 8/1996 | Hall | |
| 5,547,541 A | 8/1996 | Hansen | |
| 5,547,745 A | 8/1996 | Hansen | |
| 5,550,189 A | 8/1996 | Qin | |
| 5,554,730 A | 9/1996 | Woiszwillo | |
| 5,562,740 A | 10/1996 | Cook | |
| 5,571,618 A | 11/1996 | Hansen | |
| 5,578,678 A | 11/1996 | Hartmann | |
| 5,580,856 A | 12/1996 | Prestrelski | |
| 5,582,682 A | 12/1996 | Ferretti | |
| 5,583,193 A | 12/1996 | Aravindakshan | |
| 5,589,256 A | 12/1996 | Hansen et al. | |
| 5,589,536 A | 12/1996 | Golino | |
| 5,607,759 A | 3/1997 | Hansen | |
| 5,608,011 A | 3/1997 | Eck | |
| 5,609,727 A | 3/1997 | Hansen | |
| 5,614,570 A | 3/1997 | Hansen | |
| 5,620,940 A | 4/1997 | Birbara | |
| 5,621,026 A | 4/1997 | Tanaka | |
| 5,633,298 A | 5/1997 | Arfaei | |
| 5,641,561 A | 6/1997 | Hansen | |
| 5,643,978 A | 7/1997 | Darwin | |
| 5,645,756 A | 7/1997 | Dubin | |
| 5,660,904 A | 8/1997 | Andersen | |
| 5,661,213 A | 8/1997 | Arkens | |
| 5,670,585 A | 9/1997 | Taylor | |
| 5,672,418 A | 9/1997 | Hansen | |
| 5,672,659 A | 9/1997 | Shalaby | |
| 5,690,715 A | 11/1997 | Schiwek | |
| 5,691,060 A | 11/1997 | Levy | |
| 5,693,411 A | 12/1997 | Hansen | |
| 5,719,092 A | 2/1998 | Arrington | |
| 5,719,228 A | 2/1998 | Taylor | |
| 5,756,580 A | 5/1998 | Natori | |
| 5,763,524 A | 6/1998 | Arkens | |
| 5,788,243 A | 8/1998 | Harshaw | |
| 5,788,423 A | 8/1998 | Perkins | |
| 5,807,364 A | 9/1998 | Hansen | |
| 5,855,987 A | 1/1999 | Margel | |
| 5,863,985 A | 1/1999 | Shalaby | |
| 5,885,337 A | 3/1999 | Nohr | |
| 5,895,804 A | 4/1999 | Lee | |
| 5,905,115 A | 5/1999 | Luitjes | |
| 5,916,503 A | 6/1999 | Rettenbacher | |
| 5,919,528 A | 7/1999 | Huijs | |
| 5,919,831 A | 7/1999 | Philipp | |
| 5,922,403 A | 7/1999 | Tecle | |
| 5,925,722 A | 7/1999 | Exner | |
| 5,929,184 A | 7/1999 | Holmes-Farley | |
| 5,929,196 A | 7/1999 | Kissel | |
| 5,932,344 A | 8/1999 | Ikemoto | |
| 5,932,665 A | 8/1999 | DePorter | |
| 5,932,689 A | 8/1999 | Arkens | |
| 5,942,123 A | 8/1999 | McArdle | |
| 5,954,869 A | 9/1999 | Elfersy | |
| 5,977,224 A | 11/1999 | Cheung | |
| 5,977,232 A | 11/1999 | Arkens | |
| 5,981,719 A | 11/1999 | Woiszwillo | |

(56) References Cited

U.S. PATENT DOCUMENTS

| | | |
|---|---|---|
| 5,983,586 A | 11/1999 | Berdan, II |
| 5,990,216 A | 11/1999 | Cai |
| 5,993,709 A | 11/1999 | Bonomo |
| 6,022,615 A | 2/2000 | Rettenbacher |
| 6,067,821 A | 5/2000 | Jackson |
| 6,071,549 A | 6/2000 | Hansen |
| 6,071,994 A | 6/2000 | Hummerich |
| 6,072,086 A | 6/2000 | James |
| 6,077,883 A | 6/2000 | Taylor |
| 6,090,925 A | 7/2000 | Woiszwillo |
| 6,114,033 A | 9/2000 | Ikemoto |
| 6,114,464 A | 9/2000 | Reck |
| 6,133,347 A | 10/2000 | Vickers, Jr. |
| 6,136,916 A | 10/2000 | Arkens |
| 6,139,619 A | 10/2000 | Zaretskiy |
| 6,143,243 A | 11/2000 | Gershun |
| 6,171,444 B1 | 1/2001 | Nigam |
| 6,171,654 B1 | 1/2001 | Salsman |
| 6,180,037 B1 | 1/2001 | Andersen |
| 6,194,512 B1 | 2/2001 | Chen |
| 6,210,472 B1 | 4/2001 | Kwan |
| 6,221,958 B1 | 4/2001 | Shalaby |
| 6,221,973 B1 | 4/2001 | Arkens |
| 6,231,721 B1 | 5/2001 | Quick |
| 6,274,661 B1 | 8/2001 | Chen |
| 6,281,298 B1 | 8/2001 | Papsin, Jr. |
| 6,299,677 B1 | 10/2001 | Johnson |
| 6,299,936 B1 | 10/2001 | Reck |
| 6,306,997 B1 * | 10/2001 | Kuo et al. ............... 527/100 |
| 6,307,732 B1 | 10/2001 | Tsubaki |
| 6,310,227 B1 | 10/2001 | Sarama |
| 6,313,102 B1 | 11/2001 | Colaco |
| 6,319,683 B1 | 11/2001 | James |
| 6,331,350 B1 | 12/2001 | Taylor |
| 6,331,513 B1 | 12/2001 | Zaid |
| 6,340,411 B1 | 1/2002 | Hansen |
| 6,348,530 B1 | 2/2002 | Reck |
| 6,365,079 B1 | 4/2002 | Winkler |
| 6,372,077 B1 | 4/2002 | Tecle |
| 6,379,739 B1 | 4/2002 | Formanek |
| 6,395,856 B1 | 5/2002 | Petty |
| 6,403,665 B1 | 6/2002 | Sieker |
| 6,407,225 B1 | 6/2002 | Mang |
| 6,410,036 B1 | 6/2002 | De Rosa |
| 6,440,204 B1 | 8/2002 | Rogols |
| 6,461,553 B1 | 10/2002 | Hansen |
| 6,468,442 B2 | 10/2002 | Bytnar |
| 6,468,730 B2 | 10/2002 | Fujiwara |
| 6,469,120 B1 | 10/2002 | Elfersy |
| 6,475,552 B1 | 11/2002 | Shah |
| 6,482,875 B2 | 11/2002 | Lorenz |
| 6,495,656 B1 | 12/2002 | Haile |
| 6,521,339 B1 | 2/2003 | Hansen |
| 6,525,009 B2 | 2/2003 | Sachdev |
| 6,538,057 B1 | 3/2003 | Wildburg |
| 6,547,867 B2 | 4/2003 | Rogols |
| 6,555,616 B1 | 4/2003 | Helbing |
| 6,559,302 B1 | 5/2003 | Shah |
| 6,562,267 B1 | 5/2003 | Hansen |
| 6,596,103 B1 | 7/2003 | Hansen |
| 6,613,378 B1 | 9/2003 | Erhan |
| 6,638,882 B1 | 10/2003 | Helbing |
| 6,638,884 B2 | 10/2003 | Quick |
| 6,699,945 B1 | 3/2004 | Chen |
| 6,706,853 B1 | 3/2004 | Stanssens |
| 6,719,862 B2 | 4/2004 | Quick |
| 6,730,730 B1 | 5/2004 | Hansen |
| 6,753,361 B2 | 6/2004 | Kroner |
| 6,818,694 B2 | 11/2004 | Hindi |
| 6,821,547 B2 | 11/2004 | Shah |
| 6,852,247 B2 | 2/2005 | Bytnar |
| 6,858,074 B2 | 2/2005 | Anderson |
| 6,861,495 B2 | 3/2005 | Barsotti |
| 6,864,044 B2 | 3/2005 | Ishikawa |
| 6,878,800 B2 | 4/2005 | Husemoen |
| 6,884,849 B2 | 4/2005 | Chen |
| 6,955,844 B2 | 10/2005 | Tagge |
| 6,962,714 B2 | 11/2005 | Hei |
| 6,989,171 B2 | 1/2006 | Portman |
| 6,992,203 B2 | 1/2006 | Trusovs |
| 7,018,490 B2 | 3/2006 | Hansen |
| 7,029,717 B1 | 4/2006 | Ojima |
| 7,067,579 B2 | 6/2006 | Taylor |
| 7,083,831 B1 | 8/2006 | Koch |
| 7,090,745 B2 | 8/2006 | Beckman |
| 7,141,626 B2 | 11/2006 | Rodrigues |
| 7,144,474 B1 | 12/2006 | Hansen |
| 7,195,792 B2 | 3/2007 | Boston |
| 7,201,778 B2 | 4/2007 | Smith |
| 7,201,825 B2 | 4/2007 | Dezutter |
| 7,202,326 B2 | 4/2007 | Kuroda |
| 7,241,487 B2 | 7/2007 | Taylor |
| 7,458,235 B2 | 12/2008 | Beaufils |
| 7,514,027 B2 | 4/2009 | Horres |
| 7,655,711 B2 | 2/2010 | Swift |
| 7,772,347 B2 | 8/2010 | Swift |
| 7,795,354 B2 | 9/2010 | Srinivasan |
| 7,803,879 B2 | 9/2010 | Srinivasan |
| 7,807,771 B2 | 10/2010 | Swift |
| 7,842,382 B2 | 11/2010 | Helbing |
| 7,854,980 B2 | 12/2010 | Jackson |
| 7,883,693 B2 | 2/2011 | Sehl |
| 7,888,445 B2 | 2/2011 | Swift |
| 7,947,765 B2 | 5/2011 | Swift |
| 8,114,210 B2 | 2/2012 | Hampson |
| 8,182,648 B2 | 5/2012 | Swift |
| 8,211,923 B2 | 7/2012 | Wagner |
| 8,372,900 B2 | 2/2013 | Shooshtari |
| 8,377,564 B2 | 2/2013 | Shooshtari |
| 8,501,838 B2 | 8/2013 | Jackson |
| 8,680,224 B2 | 3/2014 | Zhang |
| 8,691,934 B2 | 4/2014 | Helbing |
| 8,900,495 B2 | 12/2014 | Pacorel |
| 2001/0017427 A1 | 8/2001 | Rosthauser |
| 2001/0046824 A1 | 11/2001 | Nigam |
| 2002/0000100 A1 | 1/2002 | Burg |
| 2002/0025435 A1 | 2/2002 | Hansen |
| 2002/0026025 A1 | 2/2002 | Kuo |
| 2002/0028857 A1 | 3/2002 | Holy |
| 2002/0032253 A1 | 3/2002 | Lorenz |
| 2002/0042473 A1 | 4/2002 | Trollsas |
| 2002/0091185 A1 | 7/2002 | Taylor |
| 2002/0096278 A1 | 7/2002 | Foster |
| 2002/0123598 A1 | 9/2002 | Sieker |
| 2002/0130439 A1 | 9/2002 | Kroner |
| 2002/0161108 A1 | 10/2002 | Schultz |
| 2002/0197352 A1 | 12/2002 | Portman |
| 2003/0005857 A1 | 1/2003 | Minami |
| 2003/0040239 A1 | 2/2003 | Toas |
| 2003/0044513 A1 | 3/2003 | Shah |
| 2003/0066523 A1 | 4/2003 | Lewis |
| 2003/0071879 A1 | 4/2003 | Swenson |
| 2003/0116294 A1 | 6/2003 | Kehrer |
| 2003/0134945 A1 | 7/2003 | Capps |
| 2003/0148084 A1 | 8/2003 | Trocino |
| 2003/0153690 A1 | 8/2003 | Husemoen |
| 2003/0185991 A1 | 10/2003 | Wigger |
| 2003/0203117 A1 | 10/2003 | Bartkowiak |
| 2004/0002567 A1 | 1/2004 | Chen |
| 2004/0019168 A1 | 1/2004 | Soerens |
| 2004/0024170 A1 | 2/2004 | Husemoen |
| 2004/0033269 A1 | 2/2004 | Hei |
| 2004/0033747 A1 | 2/2004 | Miller |
| 2004/0034154 A1 | 2/2004 | Tutin |
| 2004/0038017 A1 | 2/2004 | Tutin |
| 2004/0048531 A1 | 3/2004 | Belmares |
| 2004/0077055 A1 | 4/2004 | Fosdick |
| 2004/0079499 A1 | 4/2004 | Dezutter |
| 2004/0087024 A1 | 5/2004 | Bellocq |
| 2004/0122166 A1 | 6/2004 | O'Brien-Bernini |
| 2004/0131874 A1 | 7/2004 | Tutin |
| 2004/0144706 A1 | 7/2004 | Beaufils |
| 2004/0152824 A1 | 8/2004 | Dobrowolski |
| 2004/0161993 A1 | 8/2004 | Tripp |

(56) References Cited

U.S. PATENT DOCUMENTS

| | | |
|---|---|---|
| 2004/0209851 A1 | 10/2004 | Nelson |
| 2004/0213930 A1 | 10/2004 | Halabisky |
| 2004/0220368 A1 | 11/2004 | Li |
| 2004/0249066 A1 | 12/2004 | Heinzman |
| 2004/0254285 A1 | 12/2004 | Rodrigues |
| 2004/0260082 A1 | 12/2004 | Van Der Wilden |
| 2005/0001198 A1 | 1/2005 | Bytnar |
| 2005/0017394 A1 | 1/2005 | Hochsmann |
| 2005/0027283 A1 | 2/2005 | Richard |
| 2005/0033037 A1 | 2/2005 | Trusovs |
| 2005/0048212 A1 | 3/2005 | Clamen |
| 2005/0059770 A1 | 3/2005 | Srinivasan |
| 2005/0171085 A1 | 8/2005 | Pinto |
| 2005/0196421 A1 | 9/2005 | Hunter |
| 2005/0202224 A1 | 9/2005 | Helbing |
| 2005/0208852 A1 | 9/2005 | Weber |
| 2005/0215153 A1 | 9/2005 | Cossement |
| 2005/0245669 A1 | 11/2005 | Clungeon |
| 2005/0275133 A1 | 12/2005 | Cabell |
| 2005/0288479 A1 | 12/2005 | Kuroda |
| 2006/0005580 A1 | 1/2006 | Espiard |
| 2006/0044302 A1 | 3/2006 | Chen |
| 2006/0099870 A1 | 5/2006 | Garcia |
| 2006/0111480 A1 | 5/2006 | Hansen |
| 2006/0124538 A1 | 6/2006 | Morcrette |
| 2006/0135433 A1 | 6/2006 | Murray |
| 2006/0141177 A1 | 6/2006 | Ligtenberg |
| 2006/0179892 A1 | 8/2006 | Horres |
| 2006/0188465 A1 | 8/2006 | Perrier |
| 2006/0198954 A1 | 9/2006 | Frechem |
| 2006/0231487 A1 | 10/2006 | Bartley |
| 2006/0252855 A1 | 11/2006 | Pisanova |
| 2006/0281622 A1 | 12/2006 | Maricourt |
| 2007/0006390 A1 | 1/2007 | Clamen |
| 2007/0009582 A1 | 1/2007 | Madsen |
| 2007/0027281 A1 | 2/2007 | Michl |
| 2007/0039520 A1 | 2/2007 | Crews |
| 2007/0082983 A1 | 4/2007 | Crews |
| 2007/0123679 A1 | 5/2007 | Swift |
| 2007/0123680 A1 | 5/2007 | Swift |
| 2007/0129522 A1 | 6/2007 | Burckhardt |
| 2007/0142596 A1 | 6/2007 | Swift |
| 2007/0158022 A1 | 7/2007 | Heep |
| 2007/0184740 A1 | 8/2007 | Keller |
| 2007/0191574 A1 | 8/2007 | Miller |
| 2007/0270070 A1 | 11/2007 | Hamed |
| 2007/0292618 A1 | 12/2007 | Srinivasan |
| 2007/0292619 A1 | 12/2007 | Srinivasan |
| 2007/0298274 A1 | 12/2007 | Eriksson |
| 2008/0009209 A1 | 1/2008 | Clamen |
| 2008/0051539 A1 | 2/2008 | Kelly |
| 2008/0060551 A1 | 3/2008 | Crews |
| 2008/0081138 A1 | 4/2008 | Moore |
| 2008/0108741 A1 | 5/2008 | Van Herwijnen |
| 2008/0160260 A1 | 7/2008 | Wada |
| 2008/0160302 A1 | 7/2008 | Asrar |
| 2008/0194738 A1 | 8/2008 | Crews |
| 2009/0169867 A1 | 7/2009 | Kelly |
| 2009/0170978 A1 | 7/2009 | Kelly |
| 2009/0227732 A1 | 9/2009 | Glockner |
| 2009/0301972 A1 | 12/2009 | Hines |
| 2009/0304919 A1 | 12/2009 | Huenig |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0129640 A1 | 5/2010 | Kelly |
| 2010/0130649 A1 | 5/2010 | Swift |
| 2010/0175826 A1 | 7/2010 | Huenig |
| 2010/0210595 A1 | 8/2010 | Wagner |
| 2010/0222463 A1 | 9/2010 | Brady |
| 2010/0222566 A1 | 9/2010 | Fosdick |
| 2010/0282996 A1 | 11/2010 | Jaffrennou |
| 2010/0301256 A1 | 12/2010 | Hampson |
| 2010/0320113 A1 | 12/2010 | Swift |
| 2011/0021672 A1 | 1/2011 | Crews |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari |
| 2011/0089074 A1 | 4/2011 | Jackson |
| 2011/0135937 A1 | 6/2011 | Swift |
| 2011/0190425 A1 | 8/2011 | Swift |
| 2011/0220835 A1 | 9/2011 | Swift |
| 2011/0256790 A1 | 10/2011 | Toas |
| 2011/0260094 A1 | 10/2011 | Hampson |
| 2011/0262648 A1 | 10/2011 | Lee |
| 2011/0263757 A1 | 10/2011 | Rand |
| 2011/0306726 A1 | 12/2011 | Bailey |
| 2012/0133073 A1 | 5/2012 | Pacorel |
| 2012/0156954 A1 | 6/2012 | Eckert |
| 2013/0029150 A1 | 1/2013 | Appley |
| 2013/0047888 A1 | 2/2013 | Mueller |
| 2013/0059075 A1 | 3/2013 | Appley |
| 2013/0082205 A1 | 4/2013 | Mueller |
| 2013/0234362 A1 | 9/2013 | Swift |
| 2013/0236650 A1 | 9/2013 | Swift |
| 2013/0237113 A1 | 9/2013 | Swift |
| 2013/0244524 A1 | 9/2013 | Swift |
| 2014/0091247 A1 | 4/2014 | Jackson |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 a2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 809675 | 3/1959 |
| GB | 926749 | 5/1963 |

(56) References Cited

FOREIGN PATENT DOCUMENTS

| | | |
|---|---|---|
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| NZ | 549563 | 1/2008 |
| RU | 1765996 | 8/1995 |
| SU | 374400 | 3/1973 |
| WO | 9007541 | 7/1990 |
| WO | 9212198 | 7/1992 |
| WO | 9534517 | 12/1995 |
| WO | 9749646 | 12/1997 |
| WO | 9936368 | 7/1999 |
| WO | 9947765 | 9/1999 |
| WO | 9960042 | 11/1999 |
| WO | 9960043 | 11/1999 |
| WO | 0058085 | 10/2000 |
| WO | 0114491 | 3/2001 |
| WO | 0159026 | 8/2001 |
| WO | 0200429 | 1/2002 |
| WO | 03029496 | 4/2003 |
| WO | 03071879 | 9/2003 |
| WO | 03106561 | 12/2003 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | WO 2008089848 A1 * | 7/2008 |
| WO | 2008141201 | 11/2008 |
| WO | 2009019235 | 2/2009 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |

OTHER PUBLICATIONS

"Gamma-aminopropyltrimethoxysilane, "Hawley's Condensed Chemical Dictionary, 14th Edition, John Wiley & Sons, Inc., 2002, 1 pages.
Hodge, J.E., Chemistry of Browning Reactions in Model Systems,: 1953, J.Argic. Food Chem., vol. 1, No. 15, pp. 928-943.
Agyei-Aye et al., "The Role of Anion in the Reaction of Reducing Sugars with Ammonium Salts," Carbohydrate Research 2002, 337: 2272-2277.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 22 pages.
Opposition to EP 1732968, Notice of Opposition: Prior Art, Scope of the Patent, Reasons for the Opposition, issued from European Patent Office, Mar. 8, 2012, 18 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Office action for co-pending U.S. Appl. No. 12/524,512 (7 pages)—Aug. 6, 2012.
Office action for co-pending U.S. Appl. No. 12/524,512 (9 pages)—Apr. 1, 2013.
Office action for co-pending U.S. Appl. No. 12/524,512 (14 pages)—Nov. 12, 2014.
Office action for co-pending U.S. Appl. No. 12/524,512 (9 pages)—Jul. 10, 2015.
Office action for co-pending U.S. Appl. No. 12/524,469 (7 pages)—Jun. 7, 2012.
VOffice action for co-pending U.S. Appl. No. 12/524,469 (8 pages)—Jan. 29, 2013.
Office action for co-pending U.S. Appl. No. 12/524,469 (7 pages)—Aug. 20, 2013.
Office action for co-pending U.S. Appl. No. 12/524,469 (9 pages)—Jun. 9, 2014.
Office action for co-pending U.S. Appl. No. 12/524,469 (9 pages)—Oct. 17, 2014.
Office action for co-pending U.S. Appl. No. 12/524,469 (9 pages)—Jul. 23, 2015.
Office action for co-pending U.S. Appl. No. 12/524,539 (13 pages)—Jun. 21, 2012.
Office action for co-pending U.S. Appl. No. 12/524,539 (13 pages)—Jun. 6, 2013.
Office action for co-pending U.S. Appl. No. 12/524,539 (12 pages)—Dec. 17, 2014.
Office action for co-pending U.S. Appl. No. 12/524,539 (7 pages)—Jul. 15, 2015.
Office action for co-pending U.S. Appl. No. 12/524,522 (4 pages)—Oct. 11, 2011.
Office action for co-pending U.S. Appl. No. 12/667,718 (5 pages)—Sep. 3, 2013.
Office action for co-pending U.S. Appl. No. 12/667,718 (6 pages)—Sep. 9, 2014.
Office action for co-pending U.S. Appl. No. 12/671,922 (10 pages)—Oct. 7, 2011.
Office action for co-pending U.S. Appl. No. 12/671,922 (10 pages)—May 10, 2012.
Office action for co-pending U.S. Appl. No. 12/671,922 (9 pages)—Sep. 23, 2014.
Office action for co-pending U.S. Appl. No. 13/388,408 (5 pages)—Aug. 15, 2013.
Office action for co-pending U.S. Appl. No. 13/371,829 (9 pages)—Dec. 20, 2012.
Office action for co-pending U.S. Appl. No. 13/371,829 (6 pages)—Jul. 12, 2013.
Office action for co-pending U.S. Appl. No. 13/371,829 (6 pages)—Aug. 12, 2014.
Office action for co-pending U.S. Appl. No. 13/696,439 (11 pages)—Jan. 8, 2014.
Office action for co-pending U.S. Appl. No. 13/702,144 (6 pages)—Jan. 10, 2014.
Office action for co-pending U.S. Appl. No. 13/702,144 (7 pages)—Jul. 29, 2014.

(56) References Cited

OTHER PUBLICATIONS

Office action for co-pending U.S. Appl. No. 13/823,818 (9 pages)—Mar. 26, 2015.
Office action for co-pending U.S. Appl. No. 13/866,368 (16 pages)—Aug. 29, 2013.
Office action for co-pending U.S. Appl. No. 13/866,368 (11 pages)—Apr. 16, 2014.
Office action for co-pending U.S. Appl. No. 13/866,368 (8 pages)—Aug. 21, 2014.
Office action for co-pending U.S. Appl. No. 13/866,419 (14 pages)—Sep. 20, 2013.
Office action for co-pending U.S. Appl. No. 13/866,419 (10 pages)—Apr. 25, 2014.
Office action for co-pending U.S. Appl. No. 13/866,419 (8 pages)—Oct. 9, 2014.
Office action for co-pending U.S. Appl. No. 13/866,419 (8 pages)—Sep. 25, 2015.
Office action for co-pending U.S. Appl. No. 13/868,233 (23 pages)—Aug. 13, 2013.
Office action for co-pending U.S. Appl. No. 13/868,233 (12 pages)—Apr. 15, 2014.
Office action for co-pending U.S. Appl. No. 13/868,233 (8 pages)—Oct. 7, 2014.
Office action for co-pending U.S. Appl. No. 13/868,233 (8 pages)—Jul. 16, 2015.
Office action for co-pending U.S. Appl. No. 13/868,238 (8 pages)—Jul. 16, 2014.
Office action for co-pending U.S. Appl. No. 12/976,379 (7 pages)—Jan. 10, 2012.
Office action for co-pending U.S. Appl. No. 12/976,379 (6 pages)—Jul. 27, 2012.
Office action for co-pending U.S. Appl. No. 12/976,379 (9 pages)—Mar. 7, 2013.
Office action for co-pending U.S. Appl. No. 12/976,379 (8 pages)—Aug. 20, 2013.
Office action for co-pending U.S. Appl. No. 12/599,858 (8 pages)—May 11, 2011.
Office action for co-pending U.S. Appl. No. 13/341,542 (8 pages)—Dec. 26, 2012.
Office action for co-pending U.S. Appl. No. 13/341,542 (7 pages)—Feb. 10, 2014.
Office action for co-pending U.S. Appl. No. 14/026,394 (6 pages)—Aug. 14, 2014.
Office action for co-pending U.S. Appl. No. 14/272,556 (14 pages)—Nov. 20, 2014.
Office action for co-pending U.S. Appl. No. 14/272,556 (12 pages)—Sep. 17, 2015.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
Petition for Inter Partes Review of U.S. Pat. No. D631,670 (68 pages, filed Jun. 19, 2015 by Petitioners Johns Manville Corporation and Johns Manville, Inc.).
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. NO. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089 respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with 1st Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Decision of PTAB in Inter Partes Reexamination of U.S. Pat. No. 7,854,980 (25 pages)—Jul. 30, 2015.
Decision of PTAB regarding Institution of Inter Partes Review for U.S. Pat. No. 8,114,210 (20 pages)—Oct. 21, 2015.
Office action for co-pending U.S. Appl. No. 14/810,765 (7 pages)—Jan. 29, 2016.
Advisory Action in Ex Parte Reexamination of U.S. Pat. No. 7,854,980 (4 pages)—Nov. 18, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.

(56) References Cited

OTHER PUBLICATIONS

Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB regarding Institution of Inter Partes Review for U.S. Pat. No. D631,670 (33 pages)—Jan. 12, 2016.

* cited by examiner

COMPOSITE MAILLARD-RESOLE BINDERS

CROSS-REFERENCE TO RELATED APPLICATIONS

This application is a divisional of U.S. patent application Ser. No. 12/595,753, filed Nov. 24, 2010, which is a U.S. national application under 35 U.S.C. §371(b) of International Application Serial No. PCT/US2008/059730, filed Apr. 9, 2008, which claims the benefit of U.S. Provisional Patent Application No. 60/911,625, filed Apr. 13, 2007, the disclosures of which are hereby incorporated herein by reference.

BACKGROUND

Binders are useful in fabricating materials from non-assembled or loosely-assembled matter. For example, binders enable two or more surfaces to become united. Binders may be broadly classified into two main groups: organic and inorganic, with the organic materials being subdivided into those of animal, vegetable, and synthetic origin. Another way of classifying binders is based upon the chemical nature of these compounds: (1) protein or protein derivatives; (2) starch, cellulose, or gums and their derivatives; (3) thermoplastic synthetic resins; (4) thermosetting synthetic resins; (5) natural resins and bitumens; (6) natural and synthetic rubbers; and (7) inorganic binders. Binders also may be classified according to the purpose for which they are used: (1) bonding rigid surfaces, such as rigid plastics, and metals; and (2) bonding flexible surfaces, such as flexible plastics, and thin metallic sheets.

Thermosetting synthetic resins comprise a variety of phenol-aldehyde, urea-aldehyde, melamine-aldehyde, and other condensation-polymerization materials, such as the furane and polyurethane resins. Thermosetting synthetic resins may be characterized by being transformed into insoluble and infusible materials, i.e., thermoset binders, by means of either heat or catalytic action. Thermoset binder compositions containing phenol-formaldehyde, urea-formaldehyde, melamine-formaldehyde, and like combinations are used for the bonding of glass fibers, textiles, plastics, rubbers, and many other materials.

Resole resin is a phenol-aldehyde thermosetting synthetic resin having a molar ratio of phenol to aldehyde in the range from about 1:1.1 to about 1:5. Preferably, the molar ratio of phenol to aldehyde ranges from about 1:2 to about 1:3. The phenol component of the resole resin can include a variety of substituted and unsubstituted phenolic compounds. The aldehyde component of the resole resin is preferably formaldehyde, but can include so-called masked aldehydes or aldehyde equivalents such as acetals or hemiacetals. Specific examples of suitable aldehydes include: formaldehyde, acetaldehyde, propionaldehyde, butyraldehyde, furfuraldehyde, and benzaldehyde.

Phenol-formaldehyde (PF) resole resins, as well as phenol-formaldehyde resole resins extended with urea (PFU resins), are used in conventional processes, and have been relied on heavily over the past several years to prepare PF and PFU thermoset binders, respectively, for fiberglass insulation products. Though PFU binders are more cost-effective than PF binders and provide cured fiberglass insulation products with the requisite physical properties (e.g., flexural rigidity, tensile strength, bond strength, parting strength) and the desired thermal and acoustical performance, PFU binders may exhibit some loss in thermoset properties as the urea content increases. Further, in addition to occasionally having a distinctive or unpleasant odor, owing to the presence of formaldehyde and/or trimethylamine (the latter a byproduct of scavenging formaldehyde with urea), the resulting cured products may have a formaldehyde and/or trimethylamine content that may limit the use of PFU binders in certain applications.

Accordingly, efforts have been made to incorporate other resins and/or additives into PFU binders that can enhance, or at least not diminish, the desired properties of the resulting thermoset binder, while yielding a lower formaldehyde-emission and/or lower trimethylamine-emission product. Further, as indicated above, binders are useful in fabricating materials from non-assembled or loosely-assembled matter. Thus, notwithstanding a binder's formaldehyde and/or trimethylamine content, which content may immediately or eventually restrict its use, compositions capable of functioning as a binder are desirable.

SUMMARY

Cured or uncured binders in accordance with an illustrative embodiment of the present invention may comprise one or more of the following features or combinations thereof. In addition, materials in accordance with the present invention may comprise one or more of the following features or combinations thereof:

Initially it should be appreciated that the binders of the present invention may be utilized in a variety of fabrication applications to produce or promote cohesion in a collection of non-assembled or loosely-assembled matter. A collection includes two or more components. The binders produce or promote cohesion in at least two of the components of the collection. For example, subject binders are capable of holding a collection of matter together such that the matter adheres in a manner to resist separation. The binders described herein can be utilized in the fabrication of any material.

One potential feature of the present binders is that they may have a lower free formaldehyde content than a "pure" PFU resole binder, i.e., a PFU resole binder which does not contain additional resins and/or additives that lower formaldehyde and/or trimethylamine emissions. Accordingly, the materials the present binders are disposed upon may be lower in formaldehyde than materials with "pure" PFU resole binders disposed thereon (e.g., fiberglass). In addition, the present binders as well as the materials the present binders are disposed upon may have a reduced trimethylamine content as compared to "pure" PFU resole binders.

Another potential feature of the present binders is that they may have a higher free formaldehyde content than a binder that contains only uncured or cured Maillard reactants (as defined herein), i.e., a "pure" Maillard binder. Accordingly, the materials the present binders are disposed upon may be higher in formaldehyde than materials with "pure" Maillard binders disposed thereon (e.g., fiberglass). In addition, the present binders as well as the materials the present binders are disposed upon may have an increased trimethylamine content as compared to "pure" Maillard binders.

With respect to the present binder's chemical constituents, the binders may include a mixture of uncured resole resin and Maillard reactants. The binders may include a mixture of cured resole resin and melanoidins. The binders may include ester and/or polyester compounds. The binders may include ester and/or polyester compounds in combination with a vegetable oil, such as soybean oil. Furthermore, the binders may include ester and/or polyester compounds in combination with sodium/potassium salts of organic acids or with sodium/potassium salts of inorganic acids.

The binders of the present invention may include a non-premixed PFU resole resin or a premixed PFU resole resin. In a non-premixed PFU resole resin, excess formaldehyde in PF resin is first scavenged by the addition of ammonia. In a premixed PFU resole resin, PF resin and urea are first mixed, i.e., prereacted, at a desired ratio such that the urea forms "prepolymers" with formaldehyde.

Furthermore, the binders of the present invention may include a product of a Maillard reaction. For example, as shown in FIG. 2, Maillard reactions produce melanoidins, i.e., high molecular weight, furan ring- and nitrogen-containing polymers that vary in structure depending on the reactants and conditions of their preparation. Melanoidins display a C:N ratio, degree of unsaturation, and chemical aromaticity that increase with temperature and time of heating. (See, Ames, J. M. in "The Maillard Browning Reaction—an update," Chemistry and Industry (Great Britain), 1988, 7, 558-561, the disclosure of which is hereby incorporated herein by reference). Accordingly, the subject binders may contain melanoidins as reaction products of a Maillard reaction. It should be appreciated, however, that the subject binders may contain melanoidins or other Maillard reaction products, which products are generated by a process other than a Maillard reaction and then simply added to the composition that makes up the binder. The melanoidins in the binder may be water-insoluble. Moreover, the binders themselves may be thermoset binders.

The Maillard reactants to produce a melanoidin may include an amine reactant reacted with a reducing-sugar carbohydrate reactant. For example, an ammonium salt of a monomeric polycarboxylic acid may be reacted with (i) a monosaccharide in its aldose or ketose form or (ii) a polysaccharide or (iii) with combinations thereof. In another variation, an ammonium salt of a polymeric polycarboxylic acid may be contacted with (i) a monosaccharide in its aldose or ketose form or (ii) a polysaccharide, or (iii) with combinations thereof. In yet another variation, an amino acid may be contacted with (i) a monosaccharide in its aldose or ketose form, or (ii) with a polysaccharide or (iii) with combinations thereof. Furthermore, a peptide may be contacted with (i) a monosaccharide in its aldose or ketose form or (ii) with a polysaccharide or (iii) with combinations thereof. Moreover, a protein may be contacted with (i) a monosaccharide in its aldose or ketose form or (ii) with a polysaccharide or (iii) with combinations thereof.

It should also be appreciated that the binders of the present invention may include melanoidins produced in non-sugar variants of Maillard reactions. In these reactions an amine reactant is contacted with a non-carbohydrate carbonyl reactant. In one illustrative variation, an ammonium salt of a monomeric polycarboxylic acid is contacted with a non-carbohydrate carbonyl reactant such as pyruvaldehyde, acetaldehyde, crotonaldehyde, 2-furaldehyde, quinone, ascorbic acid, or the like, or with combinations thereof. In another variation, an ammonium salt of a polymeric polycarboxylic acid may be contacted with a non-carbohydrate carbonyl reactant such as pyruvaldehyde, acetaldehyde, crotonaldehyde, 2-furaldehyde, quinone, ascorbic acid, or the like, or with combinations thereof. In yet another illustrative variation, an amino acid may be contacted with a non-carbohydrate carbonyl reactant such as pyruvaldehyde, acetaldehyde, crotonaldehyde, 2-furaldehyde, quinone, ascorbic acid, or the like, or with combinations thereof. In another illustrative variation, a peptide may be contacted with a non-carbohydrate carbonyl reactant such as pyruvaldehyde, acetaldehyde, crotonaldehyde, 2-furaldehyde, quinone, ascorbic acid, or the like, or with combinations thereof. In still another illustrative variation, a protein may be contacted with a non-carbohydrate carbonyl reactant such as pyruvaldehyde, acetaldehyde, crotonaldehyde, 2-furaldehyde, quinone, ascorbic acid, and the like, or with combinations thereof.

The melanoidins discussed herein may be generated from melanoidin reactant compounds (e.g., Maillard reactants). These reactant compounds, together with uncured resole resin, may be disposed in an aqueous solution at an alkaline pH, which solution is therefore not corrosive. That is, the alkaline solution prevents or inhibits the eating or wearing away of a substance, such as metal, caused by chemical decomposition brought about by, for example, an acid. The melanoidin reactant compounds may include a reducing-sugar carbohydrate reactant and an amine reactant. Alternatively, the melanoidin reactant compounds may include a non-carbohydrate carbonyl reactant and an amine reactant. The uncured resole resin may include a premixed PFU resole resin. Alternatively, the uncured resole resin may include a non-premixed PFU resole resin.

It should be understood that the binders described herein may be made from a mixture of uncured resole resin and melanoidin reactant compounds themselves. That is, once the uncured resole resin and Maillard reactants are mixed, this (uncured) mixture can function as a binder of the present invention. In one illustrative embodiment, the uncured resole resin represents the predominant mole fraction of the binder. In another illustrative embodiment, the Maillard reactants represent the predominant mole fraction of the binder. In yet another illustrative embodiment, the uncured resole resin and the Maillard reactants are present in the binder in similar, but not necessarily equal, mole fractions. These binders may be utilized to fabricate uncured, bonded matter, such as fibrous materials.

In the alternative, a binder made from a mixture of uncured resole resin and Maillard reactants may be cured. In one illustrative embodiment, the cured resole resin is the predominant mole fraction of the binder. In another illustrative embodiment, the melanoidins (produced from Maillard reactants) represent the predominant mole fraction of the binder. In yet another illustrative embodiment, the cured resole resin and the melanoidins are present in the binder in similar, but not necessarily equal, mole fractions. These binders may be used to fabricate cured, bonded matter, such as fibrous compositions. These compositions may be water-resistant and, as indicated above, may include water-insoluble melanoidins.

It should be appreciated that the binders described herein may be used in manufacturing products from a collection of non-assembled or loosely-assembled matter. For example, these binders may be employed to fabricate fiber products. These products may be made from woven or nonwoven fibers. The fibers can be heat-resistant or non heat-resistant fibers or combinations thereof. In one illustrative embodiment, the binders are used to bind glass fibers to make fiberglass. In another illustrative embodiment, the binders are used to make cellulosic compositions. With respect to cellulosic compositions, the binders may be used to bind cellulosic matter to fabricate, for example, wood fiber board which has desirable physical properties (e.g., mechanical strength).

One embodiment of the present invention is directed to a method for manufacturing products from a collection of non-assembled or loosely-assembled matter. One example of using this method is in the fabrication of fiberglass. However, as indicated above, this method can be utilized in the fabrication of any material, as long as the method produces or promotes cohesion when utilized. The method may include contacting the fibers with a thermally-curable, aqueous binder. The binder may include (i) uncured resole resin, (ii) an ammonium salt of a polycarboxylic acid, and (iii) a reducing-sugar carbohydrate. The latter two reactants are melanoidin reactant compounds (i.e., these reactants produce melanoidins when reacted under conditions to initiate a Maillard reaction). The method can further include removing water from the binder in contact with the fibers (i.e., the binder is dehydrated). The method can also include curing the binder in contact with the glass fibers (e.g., thermally curing the binder).

Another example of utilizing this method is in the fabrication of cellulosic materials. The method may include contacting the cellulosic material (e.g., cellulose fibers) with a thermally-curable, aqueous binder. The binder may include (i) uncured resole resin, (ii) an ammonium salt of a polycarboxylic acid, and (iii) a reducing-sugar carbohydrate. As indicated above, the latter two reactants are melanoidin reactant compounds (i.e., these reactants produce melanoidins when reacted under conditions to initiate a Maillard reaction). The method can also include removing water from the binder in contact with the cellulosic material (i.e., the binder is dehydrated). As before, the method can also include curing the binder (e.g., thermal curing).

Illustratively, one way of using the present binders is to bind glass fibers together such that they become organized into a fiberglass mat. The mat of fiberglass may be processed to form one of several types of fiberglass materials, such as fiberglass insulation. Illustratively, the fiberglass material may have glass fibers present in the range from about 75% to about 99% by weight. The uncured binder may function to hold the glass fibers together. Alternatively, the cured binder may function to hold the glass fibers together.

In addition, the present binders may be placed in contact with cellulose fibers, such as those in a mat of wood shavings or sawdust. The mat may be processed to form one of several types of wood fiber board products. In one variation, the binder is uncured. In this variation, the uncured binder may function to hold the cellulosic fibers together. In the alternative, the cured binder may function to hold the cellulosic fibers together.

Additional features of the present invention will become apparent to those skilled in the art upon consideration of the following detailed description of illustrative embodiments exemplifying the best mode of carrying out the invention as presently perceived.

DETAILED DESCRIPTION

Figure 1:
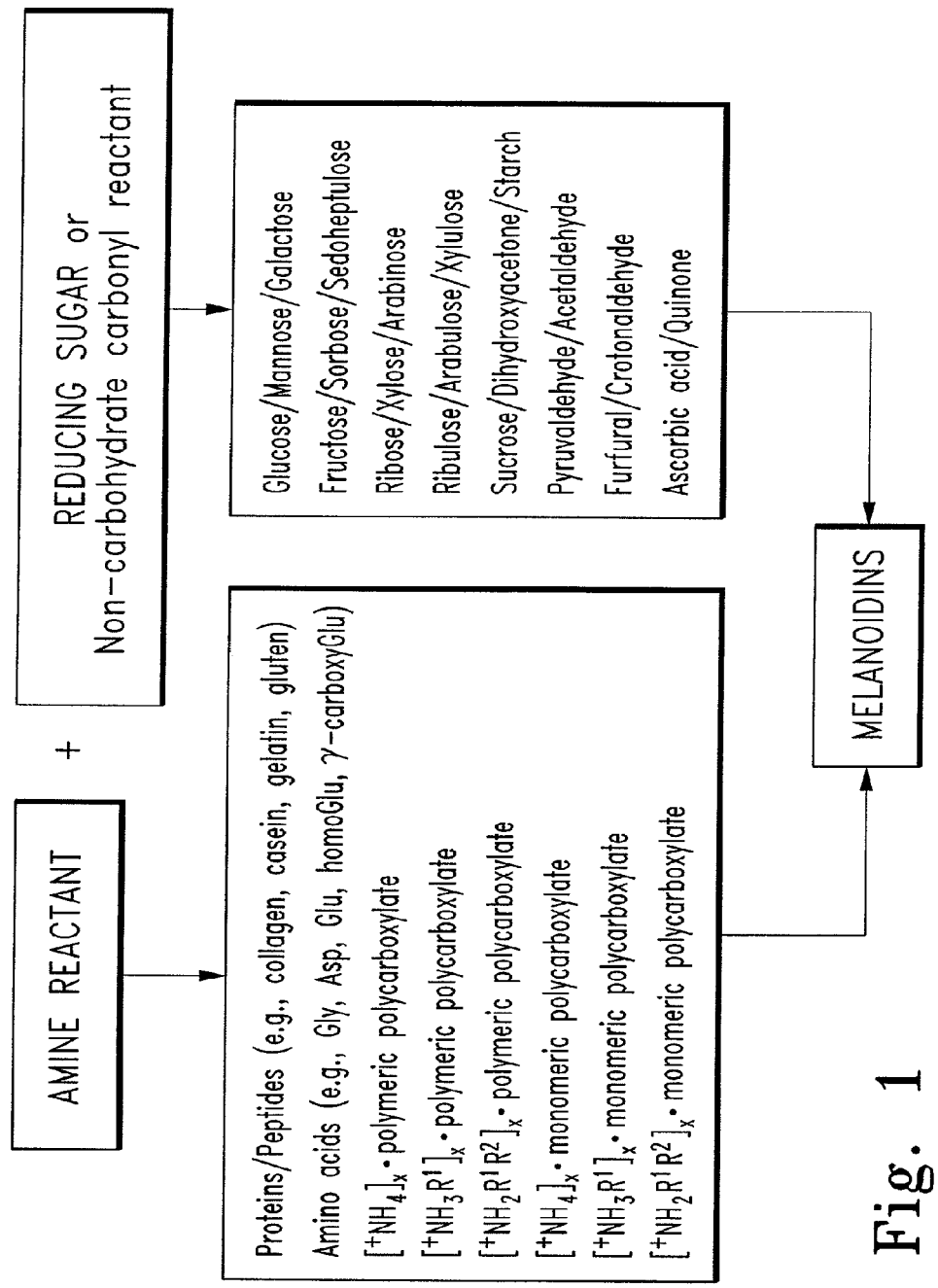
FIG. 1 shows a number of illustrative reactants for producing melanoidins.

While the invention is susceptible to various modifications and alternative forms, specific embodiments will herein be described in detail. It should be understood, however, that there is no intent to limit the invention to the particular forms described, but on the contrary, the intention is to cover all modifications, equivalents, and alternatives falling within the spirit and scope of the invention.

As used herein, the term "cured" indicates that the binder has been exposed to conditions so as to initiate a chemical change. Examples of these chemical changes include, but are not limited to, (i) covalent bonding, (ii) hydrogen bonding of binder components, and (iii) chemically cross-linking the polymers and/or oligomers in the binder. These changes may increase the binder's durability and solvent resistance as compared to the uncured binder. Curing a binder may result in the formation of a thermoset material. Furthermore, curing may include the generation of melanoidins. These melanoidins may be generated in a Maillard reaction from melanoidin reactant compounds. Curing a binder may also result in the generation of products characteristic of phenol-formaldehyde condensation-polymerization reactions. In addition, a cured binder may result in an increase in adhesion between the matter in a collection as compared to an uncured binder. Curing can be initiated by, for example, heat, microwave radiation, and/or conditions that initiate one or more of the chemical changes mentioned above.

In a situation where the chemical change in the binder results in the release of water, e.g., upon polymerization and/or cross-linking, a cure can be determined by the amount of water released above that which would occur from drying alone. The techniques used to measure the amount of water released during drying as compared to when a binder is cured are well known in the art.

In accordance with the above paragraph, an uncured binder is one that has not been cured.

As used herein, the term "alkaline" indicates a solution having a pH that is greater than or equal to about 7. For example, the pH of the solution can be less than or equal to about 10. In addition, the solution may have a pH from about 7 to about 10, or from about 8 to about 10, or from about 9 to about 10.

As used herein, the term "non-premixed PFU resole resin" indicates that excess formaldehyde in PF resin is first scavenged by the addition of ammonia. This involves the addition of ammonia sufficient to convert free formaldehyde to hexamethylenetetramine—4 moles of formaldehyde react with 6 moles of ammonia—and this conversion typically occurs quickly and with a noticeable release of heat. Subsequently, urea is added in an amount sufficient to react with the formaldehyde that will be liberated from the hexamethylenetetramine upon cure. To the resulting PFU resin is added an ammonium salt, typically ammonium sulfate, which serves as a latent acid catalyst. The ammonium moiety is consumed during cure, both by volatilization as ammonia and by participation in polymer formation, and in the process loses a proton, thus acidifying the curing environment. Such acidification aids in catalyzing polymerization reactions between urea and formaldehyde. Without acidification, greater amounts of formaldehyde are released upon cure, which can be detrimental to the strength of the binder and undesirable from an environmental standpoint. A calculation of the amount of ammonium salt generally required in the binder indicates that the protons released (one per ammonium moiety) must exceed the residual sodium hydroxide in the resin by at least 1% on a solids basis.

As used herein, the term "pre-mixed PFU resole resin" indicates that PF resin and urea are first mixed, i.e., prereacted, at a desired ratio such that the urea forms "prepolymers" with formaldehyde over the course of 8 to 12 hours. The purpose of premixing is to reduce the free formaldehyde content of the PF resole resin to a level that does not increase the ammonia demand of binder solutions prepared with the premix. Such mixing destabilize phenolic dimers and trimers to precipitation, and this destabilization typically occurs about 48 hours later. Formaldehyde is a stabilizer of the resin components because it forms reversible "polyformaldehyde," i.e., polymethyleneglycol, from the phenol and methylol hydroxyl groups (—OH) that the molecules present to the solution. Prepolymer species are typically methylolurea or dimethylolurea (one methylol per amide nitrogen); trimethylolurea and tetramethylolurea are typically formed too slowly to be of any significant contribution. Generally, a free formaldehyde level below 0.5%, on a wet basis for the mixture, serves as a signal that the premix period is complete and the premix itself is ready for use.

As used herein, the term "ammonium" includes, but is not limited to, $^+NH_4$, $^+NH_3R^1$, and $^+NH_2R^1R^2$, where $R^1$ and $R^2$ are each independently selected in $^+NH_2R^1R^2$, and where $R^1$ and $R^2$ are selected from alkyl, cycloalkyl, alkenyl, cycloalkenyl, heterocyclyl, aryl, and heteroaryl.

The term "alkyl" refers to a saturated monovalent chain of carbon atoms, which may be optionally branched; the term "cycloalkyl" refers to a monovalent chain of carbon atoms, a portion of which forms a ring; the term "alkenyl" refers to an unsaturated monovalent chain of carbon atoms including at least one double bond, which may be optionally branched; the term "cycloalkenyl" refers to an unsaturated monovalent chain of carbon atoms, a portion of which forms a ring; the term "heterocyclyl" refers to a monovalent chain of carbon and heteroatoms, wherein the heteroatoms are selected from nitrogen, oxygen, and sulfur, a portion of which, including at least one heteroatom, form a ring; the term "aryl" refers to an aromatic mono or polycyclic ring of carbon atoms, such as phenyl, naphthyl, and the like; and the term "heteroaryl" refers to an aromatic mono or polycyclic ring of carbon atoms and at least one heteroatom selected from nitrogen, oxygen, and sulfur, such as pyridinyl, pyrimidinyl, indolyl, benzoxazolyl, and the like. It is to be understood that each of alkyl, cycloalkyl, alkenyl, cycloalkenyl, and heterocyclyl may be optionally substituted with independently selected groups such as alkyl, haloalkyl, hydroxyalkyl, aminoalkyl, carboxylic acid and derivatives thereof, including esters, amides, and nitriles, hydroxy, alkoxy, acyloxy, amino, alkyl and dialkylamino, acylamino, thio, and the like, and combinations thereof. It is further to be understood that each of aryl and heteroaryl may be optionally substituted with one or more independently selected substituents, such as halo, hydroxy, amino, alkyl or dialkylamino, alkoxy, alkylsulfonyl, cyano, nitro, and the like.

As used herein, the term "polycarboxylic acid" indicates a dicarboxylic, tricarboxylic, tetracarboxylic, pentacarboxylic, and like monomeric polycarboxylic acids, and anhydrides, and combinations thereof, as well as polymeric polycarboxylic acids, anhydrides, copolymers, and combinations thereof. In one aspect, the polycarboxylic acid ammonium salt reactant is sufficiently non-volatile to maximize its ability to remain available for reaction with the carbohydrate reactant of a Maillard reaction (discussed below). In another aspect, the polycarboxylic acid ammonium salt reactant may be substituted with other chemical functional groups.

Illustratively, a monomeric polycarboxylic acid may be a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Or, illustratively, the polycarboxylic acid itself may be a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids may be optionally substituted, such as with hydroxy, halo, alkyl, alkoxy, and the like. In one variation, the polycarboxylic acid is the saturated aliphatic tricarboxylic acid, citric acid. Other suitable polycarboxylic acids are contemplated to include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and combinations thereof.

Illustratively, a polymeric polycarboxylic acid may be an acid, including, but not limited to, polyacrylic acid, polymethacrylic acid, polymaleic acid, and like polymeric polycarboxylic acids, anhydrides thereof, and mixtures thereof, as well as copolymers of acrylic acid, methacrylic acid, maleic acid, and like carboxylic acids, anhydrides thereof, and mixtures thereof. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is a water-soluble polyacrylic copolymer of acrylic acid and maleic acid, having a molecular weight of approximately 4000. AQUASET-529 is a composition containing polyacrylic acid cross-linked with glycerol, also containing sodium hypophosphite as a catalyst. CRITERION 2000 is an acidic solution of a partial salt of polyacrylic acid, having a molecular weight of approximately 2000. With respect to NF1, this is a copolymer containing carboxylic acid functionality and hydroxy functionality, as well as units with neither functionality; NF1 also contains chain transfer agents, such as sodium hypophosphite or organophosphate catalysts.

Further, compositions including polymeric polycarboxylic acids are also contemplated to be useful in preparing the binders described herein, such as those compositions described in U.S. Pat. Nos. 5,318,990, 5,661,213, 6,136,916, and 6,331,350, the disclosures of which are hereby incorporated herein by reference. Described in U.S. Pat. Nos. 5,318, 990 and 6,331,350 are compositions comprising an aqueous solution of a polymeric polycarboxylic acid, a polyol, and a catalyst.

As described in U.S. Pat. Nos. 5,318,990 and 6,331,350, the polymeric polycarboxylic acid comprises an organic polymer or oligomer containing more than one pendant carboxy group. The polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. The polymeric polycarboxylic acids may comprise homopolymers and copolymers of polyacrylic acid. The molecular weight of the polymeric polycarboxylic acid, and in particular polyacrylic acid polymer, may be is less than 10000, less than 5000, or about 3000 or less. For example, the molecular weight may be 2000.

As described in U.S. Pat. Nos. 5,318,990 and 6,331,350, the polyol (in a composition including a polymeric polycarboxylic acid) contains at least two hydroxyl groups. The polyol should be sufficiently nonvolatile such that it will substantially remain available for reaction with the polymeric polycarboxylic acid in the composition during heating and curing operations. The polyol may be a compound with a molecular weight less than about 1000 bearing at least two hydroxyl groups such as, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols, for example, β-hydroxyalkylamides such as, for example, bis[N,N-di(β-hydroxyethyl)]adipamide, or it may be an addition polymer containing at least two hydroxyl groups such as, polyvinyl alcohol, partially hydrolyzed polyvinyl acetate, and homopolymers or copolymers of hydroxyethyl(meth)acrylate, hydroxypropyl(meth)acrylate, and the like.

As described in U.S. Pat. Nos. 5,318,990 and 6,331,350, the catalyst (in a composition including a polymeric polycarboxylic acid) is a phosphorous-containing accelerator which may be a compound with a molecular weight less than about 1000 such as, an alkali metal polyphosphate, an alkali metal dihydrogen phosphate, a polyphosphoric acid, and an alkyl phosphinic acid or it may be an oligomer or polymer bearing phosphorous-containing groups, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polymeric polycarboxylic acid and the polyol. A level of phosphorous-containing accelerator of from about 2.5% to about 10%, by weight based on the combined weight of the polymeric polycarboxylic acid and the polyol may be used. Examples of such catalysts include, but are not limited to, sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, as well as mixtures thereof.

Compositions including polymeric polycarboxylic acids described in U.S. Pat. Nos. 5,661,213 and 6,136,916 that are contemplated to be useful in preparing the binders described herein comprise an aqueous solution of a polymeric polycarboxylic acid, a polyol containing at least two hydroxyl groups, and a phosphorous-containing accelerator, wherein the ratio of the number of equivalents of carboxylic acid groups to the number of equivalents of hydroxyl groups is from about 1:0.01 to about 1:3

As described in U.S. Pat. Nos. 5,661,213 and 6,136,916, the polymeric polycarboxylic acid may be a polyester containing at least two carboxylic acid groups or an addition polymer or oligomer containing at least two copolymerized carboxylic acid-functional monomers. The polymeric polycarboxylic acid is preferably an addition polymer formed from at least one ethylenically unsaturated monomer. The addition polymer may be in the form of a solution of the addition polymer in an aqueous medium such as, an alkali-soluble resin which has been solubilized in a basic medium; in the form of an aqueous dispersion, for example, an emulsion-polymerized dispersion; or in the form of an aqueous suspension. The addition polymer must contain at least two carboxylic acid groups, anhydride groups, or salts thereof. Ethylenically unsaturated carboxylic acids such as, methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, and monoalkyl fumarates; ethylenically unsaturated anhydrides, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomers may include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like. The addition polymer containing at least two carboxylic acid groups, anhydride groups, or salts thereof may have a molecular weight from about 300 to about 10,000,000. A molecular weight from about 1000 to about 250,000 may be used. When the addition polymer is an alkali-soluble resin having a carboxylic acid, anhydride, or salt thereof, content of from about 5% to about 30%, by weight based on the total weight of the addition polymer, a molecular weight from about 10,000 to about 100,000 may be utilized Methods for preparing these additional polymers are well-known in the art.

As described in U.S. Pat. Nos. 5,661,213 and 6,136,916, the polyol (in a composition including a polymeric polycarboxylic acid) contains at least two hydroxyl groups and should be sufficiently nonvolatile that it remains substantially available for reaction with the polymeric polycarboxylic acid in the composition during heating and curing operations. The polyol may be a compound with a molecular weight less than about 1000 bearing at least two hydroxyl groups, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols, for example, β-hydroxyalkylamides, for example, bis-[N,N-di(β-hydroxyethyl)]adipamide, bis[N,N-di(β-hydroxypropyl)]azelamide, bis[N—N-di(β-hydroxypropyl)]adipamide, bis[N—N-di(β-hydroxypropyl)]glutaramide, bis[N—N-di(β-hydroxypropyl)]succinamide, and bis[N-methyl-N-(β-hydroxyethyl)]oxamide, or it may be an addition polymer containing at least two hydroxyl groups such as, polyvinyl alcohol, partially hydrolyzed polyvinyl acetate, and homopolymers or copolymers of hydroxyethyl (meth)acrylate, hydroxypropyl (meth)acrylate, and the like.

As described in U.S. Pat. Nos. 5,661,213 and 6,136,916, the phosphorous-containing accelerator (in a composition including a polymeric polycarboxylic acid) may be a compound with a molecular weight less than about 1000, such as an alkali metal hypophosphite salt, an alkali metal phosphite, an alkali metal polyphosphate, an alkali metal dihydrogen phosphate, a polyphosphoric acid, and an alkyl phosphinic acid, or it may be an oligomer or polymer bearing phosphorous-containing groups such as addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. A level of phosphorous-containing accelerator of from about 2.5% to about 10%, by weight based on the combined weight of the polyacid and the polyol, may be utilized.

As used herein, the term "amine base" includes, but is not limited to, ammonia, a primary amine, i.e., $NH_2R^1$, and a secondary amine, i.e., $NHR^1R^2$, where $R^1$ and $R^2$ are each independently selected in $NHR^1R^2$, and where $R^1$ and $R^2$ are selected from alkyl, cycloalkyl, alkenyl, cycloalkenyl, heterocyclyl, aryl, and heteroaryl, as defined herein. Illustratively, the amine base may be substantially volatile or substantially non-volatile under conditions sufficient to promote formation of the thermoset binder during thermal curing. Illustratively, the amine base may be a substantially volatile base, such as ammonia, ethylamine, diethylamine, dimethylamine, ethylpropylamine, and the like. Alternatively, the amine base may be a substantially non-volatile base, such as aniline, 1-naphthylamine, 2-naphthylamine, para-aminophenol, and the like.

As used herein, "reducing sugar" indicates one or more sugars that contain aldehyde groups, or that can isomerize, i.e., tautomerize, to contain aldehyde groups, which groups are reactive with an amino group under Maillard reaction conditions and which groups may be oxidized with, for example, $Cu^{+2}$ to afford carboxylic acids. It is also appreciated that any such carbohydrate reactant may be optionally substituted, such as with hydroxy, halo, alkyl, alkoxy, and the like. It is further appreciated that in any such carbohydrate reactant, one or more chiral centers are present, and that both possible optical isomers at each chiral center are contemplated to be included in the invention described herein. Further, it is also to be understood that various mixtures, including racemic mixtures, or other diastereomeric mixtures of the various optical isomers of any such carbohydrate reactant, as well as various geometric isomers thereof, may be used in one or more embodiments described herein.

As used herein, the term "fiberglass" indicates heat-resistant fibers suitable for withstanding elevated temperatures. Examples of such fibers include, but are not limited to, mineral fibers (e.g., rock fibers), aramid fibers, ceramic fibers, metal fibers, carbon fibers, polyimide fibers, certain polyester fibers, rayon fibers, mineral wool (e.g., glass wool or rock wool), and glass fibers. Illustratively, such fibers are substantially unaffected by exposure to temperatures above about 120° C.

FIG. 1 shows examples of reactants for a Maillard reaction. Examples of amine reactants include proteins, peptides, amino acids, ammonium salts of polymeric polycarboxylic acids, and ammonium salts of monomeric polycarboxylic acids. As illustrated, "ammonium" can be $[^+NH_4]_x$, $[^+NH_3R^1]_x$, and $[^+NH_2R^1R^2]_x$, where x is at least about 1. With respect to $^+NH_2R^1R^2$, $R^1$ and $R^2$ are each independently selected. Moreover, $R^1$ and $R^2$ are selected from alkyl, cycloalkyl, alkenyl, cycloalkenyl, heterocyclyl, aryl, and heteroaryl, as described above. FIG. 1 also illustrates examples of reducing-sugar reactants for producing melanoidins, including monosaccharides, in their aldose or ketose form, polysaccharides, or combinations thereof. Illustrative non-carbohydrate carbonyl reactants for producing melanoidins are also shown in FIG. 1, and include various aldehydes, e.g., pyruvaldehyde and furfural, as well as compounds such as ascorbic acid and quinone.

Figure 2:
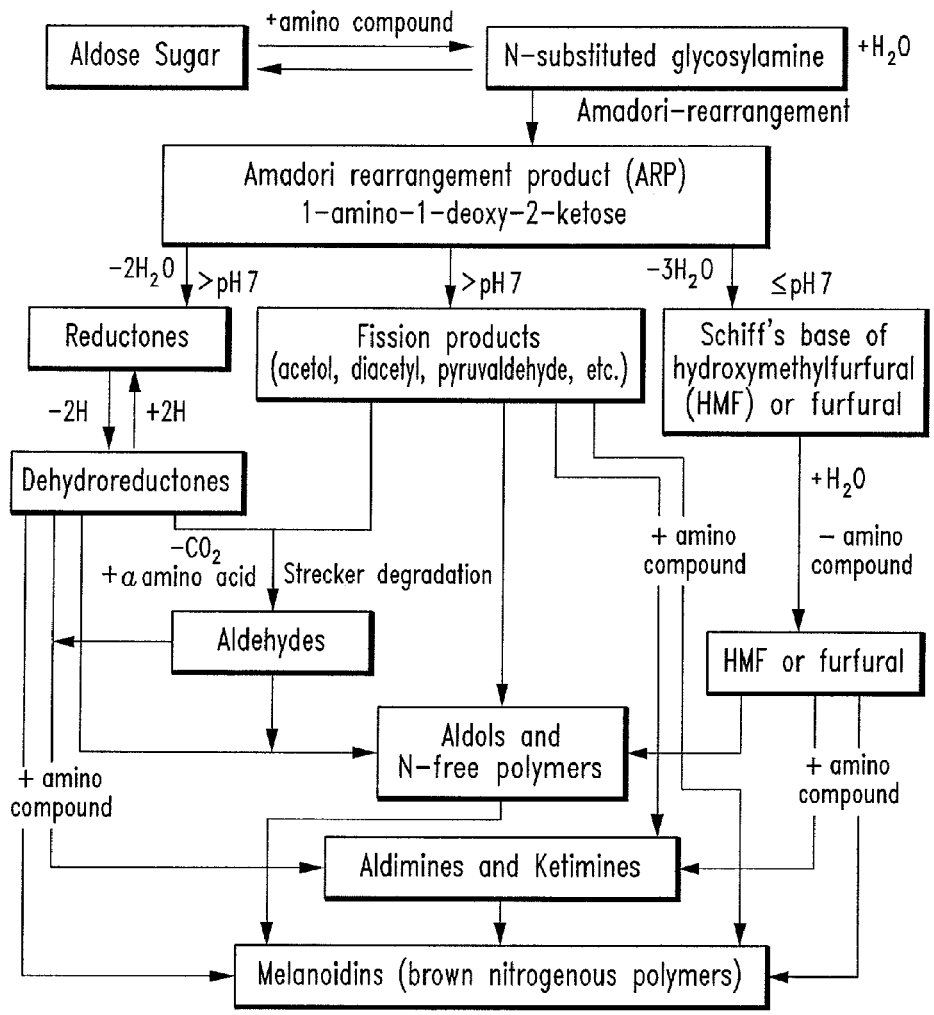
FIG. 2 illustrates a Maillard reaction schematic when reacting a reducing sugar with an amino compound.

FIG. 2 shows a schematic of a Maillard reaction, which culminates in the production of melanoidins. In its initial phase, a Maillard reaction involves a carbohydrate reactant, for example, a reducing or aldose sugar (note that the carbohydrate reactant may come from a substance capable of producing a reducing sugar under Maillard reaction conditions). The reaction also involves condensing the carbohydrate reactant (e.g., a reducing or aldose sugar) with an amine reactant, e.g., an amino compound possessing an amino group. In other words, the carbohydrate reactant and the amine reactant for a Maillard reaction are the melanoidin reactant compounds. The condensation of these two reactants produces an N-substituted glycosylamine. For a more detailed description of the Maillard reaction see, Hodge, J. E. Chemistry of Browning Reactions in Model Systems *J. Agric. Food Chem.* 1953, 1, 928-943, the disclosure of which is hereby incorporated herein by reference. The compound possessing a free amino group in a Maillard reaction, which compound serves as the amine reactant, may be present in the form of an amino acid. The free amino group can also come from a protein, where the free amino groups are available in the form of, for example, the ε-amino group of lysine residues, and/or the α-amino group of the terminal amino acid. Alternatively, an ammonium salt of a polycarboxylic acid may serve as the amine reactant in a Maillard reaction.

Another aspect of conducting a Maillard reaction as described herein is that, initially, an aqueous mixture of uncured resole resin and Maillard reactants (which mixture also is a binder), as described above, has an alkaline pH. However, once the solution is disposed on a collection of non-assembled or loosely-assembled matter, and curing is initiated, the pH decreases (i.e., the binder becomes acidic). It should be understood that when fabricating a material, the amount of contact between the binder and components of machinery used in the fabrication is greater prior to curing (i.e., when the binder solution is alkaline) as compared to after the binder is cured (i.e., when the binder is acidic). An alkaline composition is less corrosive than an acidic composition. Accordingly, corrosivity of the fabrication process is decreased.

It should be appreciated that by using an aqueous mixture of uncured resole resin and Maillard reactants as a binder, as described herein, the machinery used to fabricate fiberglass is not exposed to an acidic solution because, as described above, the pH of the aqueous mixture is alkaline. Furthermore, during the fabrication process, the only time an acidic condition develops is after the binder has been applied to glass fibers. Once the binder is applied to the glass fibers, the binder and the material that incorporates the binder have relatively infrequent contact with the components of the machinery, as compared to the time prior to applying the binder to the glass fibers. Accordingly, corrosivity of fiberglass fabrication (and the fabrication of other materials) is decreased.

Covalent reaction of phenol and formaldehyde as components of a PF resole binder, subsequent reaction with ammonia and/or urea, and, ultimately, loss of excess ammonia during cure, to form a polymerized, water-resistant thermoset binder are well known to one of ordinarly skill in the art. Without being bound to theory, covalent reaction of the polycarboxylic acid ammonium salt and reducing sugar reactants of a Maillard reaction, which as described herein occurs substantially during thermal curing to produce brown-colored nitrogenous polymeric and co-polymeric melanoidins of varying structure, is thought to involve initial Maillard reaction of ammonia with the aldehyde moiety of a reducing-sugar carbohydrate reactant to afford N-substituted glycosylamine, as shown in FIG. 2. Consumption of ammonia in such a way, with ammonia and a reducing-sugar carbohydrate reactant combination functioning as a latent acid catalyst, would be expected to result in a decrease in pH, concomitant to the decrease in pH that is known to accompany thermal curing of a resole binder, which decrease is believed to promote esterification processes and/or dehydration of the polycarboxylic acid to afford its corresponding anhydride derivative. At pH≤7, the Amadori rearrangement product of N-substituted glycosylamine, i.e., 1-amino-1-deoxy-2-ketose, would be expected to undergo mainly 1,2-enolization with the formation of furfural when, for example, pentoses are involved, or hydroxymethylfurfural when, for example, hexoses are involved, as a prelude to melanoidin production. Concurrently, contemporaneously, or sequentially with the production of melanoidins, esterification processes may occur involving melanoidins, polycarboxylic acid and/or its corresponding anhydride derivative, and residual carbohydrate, which processes lead to extensive cross-linking Accompanied by sugar dehydration reactions, whereupon conjugated double bonds are produced that may undergo polymerization, a water-resistant thermoset binder is produced consisting of polyester adducts interconnected by a network of carbon-carbon single bonds.

Figure 3:
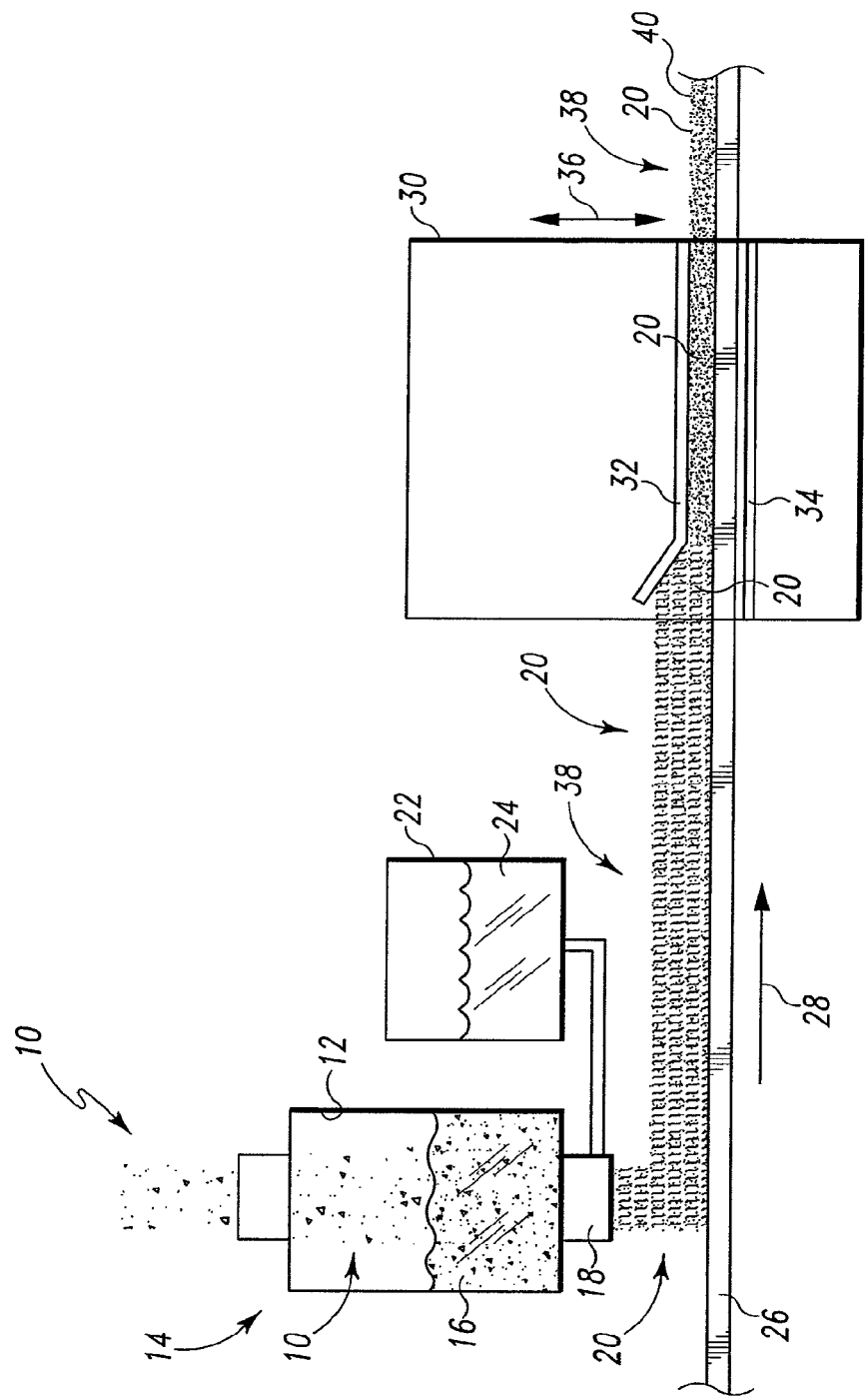
FIG. 3 shows an exemplary schematic that depicts one way of disposing a binder onto fibers.

FIG. 3 is an exemplary schematic showing one embodiment of a process for disposing a binder of the present invention onto a substrate such as glass fibers. In particular, as shown in FIG. 3, silica (sand) particles 10 are placed in the interior 12 of a vat 14, where the particles 10 are moltenized to produce molten glass 16. Molten glass 16 is then advanced through a fiberizer 18 so as to fiberize molten glass 16 into glass fibers 20. A container 22 that contains a liquid uncured binder 24 of the present invention is in fluid communication with fiberizer 18 and disposes the liquid uncured binder 24 onto glass fibers 20 so as to bind the fibers together. Glass fibers 20 are placed onto a forming chain 26 so as to form a collection 38 of glass fibers 20. The collection 38 is then advanced in the direction indicated by arrow 28 so as to enter oven 30 where the collection is heated and curing occurs. While positioned in oven 30, collection 38 is positioned between flights 32 and 34. Flight 32 can be moved relative to flight 34 in the direction indicated by arrow 36, i.e., flight 32 can be positioned closer to flight 34 or moved away from flight 34 thereby adjusting the distance between flights 32 and 34. As shown in FIG. 3, flight 32 has been moved relative to flight 34 so as to exert a compressive force on collection 38 as it moves through the oven 30. Subjecting the collection 38 to a compressive force decreases the thickness of collection 38 as compared to its thickness prior to encountering flights 32 and 34. Accordingly, the density of the collection 38 is increased as compared to its density prior to encountering flights 32 and 34. As mentioned above, the collection 38 is heated in the oven 30 and curing occurs so as to produce a cured binder 40 being disposed on glass fibers 20. The curing may result in a thermoset binder material being disposed upon glass fibers 20. The collection 38 then exits oven 30 where it can be utilized in various products, for example, products such as flexible duct media, acoustical board, pipe insulation, batt residential insulation, and elevated panel insulation to name a few.

The above description sets forth one example of how to adjust a process parameter to obtain one or more desirable physical/chemical characteristics of a collection bound together by a binder of the present invention, e.g., the thickness and density of the collection is altered as it passes through the oven. However, it should be appreciated that a number of other parameters (one or more) can also be adjusted to obtain desirable characteristics. These include the amount of binder applied onto the glass fibers, the type of silica utilized to make the glass fibers, the size of the glass fibers (e.g., fiber diameter, fiber length and fiber thickness) that make up a collection. What the desirable characteristic are will depend upon the type of product being manufactured, e.g., flexible duct media, acoustical board, pipe insulation, batt residential insulation, and elevated panel insulation to name a few. The desirable characteristics associated with any particular product are well known in the art. With respect to what process parameters to manipulate and how they are manipulated to obtain the desirable physical/chemical characteristics, e.g., thermal properties and acoustical characteristics, these can be determined by routine experimentation. For example, a collection having a greater density is desirable when fabricating acoustical board as compared with the density required when fabricating residential insulation.

The following discussion is directed to (i) examples of reactants that can be used to prepare resole resin, (ii) examples of carbohydrate and amine reactants, which reactants can be used in a Maillard reaction, (iii) how these reactants can be combined with each other and with various additives to prepare binders of the present invention, and iv) illustrative embodiments of the binders described herein used as glass fiber binders in fiberglass insulation products. First, it should be understood that any carbohydrate and any compound (in addition to ammonia) possessing a primary or secondary amino group, which will act as a reactant in a Maillard reaction, can be utilized in the binders of the present invention. Such compounds can be identified and utilized by one of ordinary skill in the art with the guidelines disclosed herein.

With respect to exemplary reactants, and in addition to urea, it should be appreciated that the phenol component of resole resin can include a variety of substituted and unsubstituted phenolic compounds. The aldehyde component of resole resin is preferably formaldehyde, but can include so-called masked aldehydes or aldehyde equivalents such as acetals or hemiacetals. Specific examples of suitable aldehydes include: formaldehyde, acetaldehyde, propionaldehyde, butyraldehyde, furfuraldehyde, and benzaldehyde.

Further with respect to exemplary reactants, it should also be appreciated that using an ammonium salt of a polycarboxylic acid as an amine reactant is an effective reactant in a Maillard reaction. Ammonium salts of polycarboxylic acids can be generated by neutralizing the acid groups with an amine base, thereby producing polycarboxylic acid ammonium salt groups. Complete neutralization, i.e., about 100% calculated on an equivalents basis, may eliminate any need to titrate or partially neutralize acid groups in the polycarboxylic acid prior to binder formation. However, it is expected that less-than-complete neutralization would not inhibit formation of the binder. Note that neutralization of the acid groups of the polycarboxylic acid may be carried out either before or after the polycarboxylic acid is mixed with the carbohydrate.

With respect to the carbohydrate reactant, it may include one or more reactants having one or more reducing sugars. In one aspect, any carbohydrate reactant should be sufficiently nonvolatile to maximize its ability to remain available for reaction with the polycarboxylic acid ammonium salt reactant. The carbohydrate reactant may be a monosaccharide in its aldose or ketose form, including a triose, a tetrose, a pentose, a hexose, or a heptose; or a polysaccharide; or combinations thereof. A carbohydrate reactant may be a reducing sugar, or one that yields one or more reducing sugars in situ under thermal curing conditions. For example, when a triose serves as the carbohydrate reactant, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate reactant, or is used in combination with other reducing sugars and/or a polysaccharide, aldotetrose sugars, such as erythrose and threose; and ketotetrose sugars, such as erythrulose, may be utilized. When a pentose serves as the carbohydrate reactant, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate reactant, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate reactant, or is used in combination with other reducing sugars and/or a polysaccharide, a ketoheptose sugar such as sedoheptulose may be utilized. Other stereoisomers of such carbohydrate reactants not known to occur naturally are also contemplated to be useful in preparing the binder compositions as described herein. When a polysaccharide serves as the carbohydrate, or is used in combination with monosaccharides, sucrose, lactose, maltose, starch, and cellulose may be utilized.

Furthermore, the carbohydrate reactant in the Maillard reaction may be used in combination with a non-carbohydrate polyhydroxy reactant. Examples of non-carbohydrate polyhydroxy reactants which can be used in combination with the carbohydrate reactant include, but are not limited to, trimethylolpropane, glycerol, pentaerythritol, sorbitol, 1,5-pentanediol, 1,6-hexanediol, polyTHF$_{650}$, polyTHF$_{250}$, textrion whey, polyvinyl alcohol, partially hydrolyzed polyvinyl acetate, fully hydrolyzed polyvinyl acetate, and mixtures thereof. In one aspect, the non-carbohydrate polyhydroxy reactant is sufficiently nonvolatile to maximize its ability to remain available for reaction with a monomeric or polymeric polycarboxylic acid reactant. It is appreciated that the hydrophobicity of the non-carbohydrate polyhydroxy reactant may be a factor in determining the physical properties of a binder prepared as described herein.

When a partially hydrolyzed polyvinyl acetate serves as a non-carbohydrate polyhydroxy reactant, a commercially available compound such as an 87-89% hydrolyzed polyvinyl acetate may be utilized, such as, DuPont ELVANOL 51-05. DuPont ELVANOL 51-05 has a molecular weight of about 22,000-26,000 Da and a viscosity of about 5.0-6.0 centipoises. Other partially hydrolyzed polyvinyl acetates contemplated to be useful in preparing binder compositions as described herein include, but are not limited to, 87-89% hydrolyzed polyvinyl acetates differing in molecular weight and viscosity from ELVANOL 51-05, such as, for example, DuPont ELVANOL 51-04, ELVANOL 51-08, ELVANOL 50-14, ELVANOL 52-22, ELVANOL 50-26, ELVANOL 50-42; and partially hydrolyzed polyvinyl acetates differing in molecular weight, viscosity, and/or degree of hydrolysis from ELVANOL 51-05, such as, DuPont ELVANOL 51-03 (86-89% hydrolyzed), ELVANOL 70-14 (95.0-97.0% hydrolyzed), ELVANOL 70-27 (95.5-96.5% hydrolyzed), ELVANOL 60-30 (90-93% hydrolyzed). Other partially hydrolyzed polyvinyl acetates contemplated to be useful in preparing binder compositions as described herein include, but are not limited to, Clariant MOWIOL 15-79, MOWIOL 3-83, MOWIOL 4-88, MOWIOL 5-88, MOWIOL 8-88, MOWIOL 18-88, MOWIOL 23-88, MOWIOL 26-88, MOWIOL 40-88, MOWIOL 47-88, and MOWIOL 30-92, as well as Celanese CELVOL 203, CELVOL 205, CELVOL 502, CELVOL 504, CELVOL 513, CELVOL 523, CELVOL 523TV, CELVOL 530, CELVOL 540, CELVOL 540TV, CELVOL 418, CELVOL 425, and CELVOL 443. Also contemplated to be useful are similar or analogous partially hydrolyzed polyvinyl acetates available from other commercial suppliers.

When a fully hydrolyzed polyvinyl acetate serves as a non-carbohydrate polyhydroxy reactant, Clariant MOWIOL 4-98, having a molecular weight of about 27,000 Da, may be utilized. Other fully hydrolyzed polyvinyl acetates contemplated to be useful include, but are not limited to, DuPont ELVANOL 70-03 (98.0-98.8% hydrolyzed), ELVANOL 70-04 (98.0-98.8% hydrolyzed), ELVANOL 70-06 (98.5-99.2% hydrolyzed), ELVANOL 90-50 (99.0-99.8% hydrolyzed), ELVANOL 70-20 (98.5-99.2% hydrolyzed), ELVANOL 70-30 (98.5-99.2% hydrolyzed), ELVANOL 71-30 (99.0-99.8% hydrolyzed), ELVANOL 70-62 (98.4-99.8% hydrolyzed), ELVANOL 70-63 (98.5-99.2% hydrolyzed), ELVANOL 70-75 (98.5-99.2% hydrolyzed), Clariant MOWIOL 3-98, MOWIOL 6-98, MOWIOL 10-98, MOWIOL 20-98, MOWIOL 56-98, MOWIOL 28-99, and Celanese CELVOL 103, CELVOL 107, CELVOL 305, CELVOL 310, CELVOL 325, CELVOL 325LA, and CELVOL 350, as well as similar or analogous fully hydrolyzed polyvinyl acetates from other commercial suppliers.

The aforementioned Maillard reactants may be combined with uncured resole resin to make an aqueous composition that includes a carbohydrate reactant, an amine reactant, and uncured resole resin. These aqueous binders represent examples of uncured binders. As discussed below, these aqueous compositions can be used as binders of the present invention. These binders are curable, alkaline, aqueous binder compositions. Furthermore, as indicated above, the carbohydrate reactant of the Maillard reactants may be used in combination with a non-carbohydrate polyhydroxy reactant. Accordingly, any time the carbohydrate reactant is mentioned, it should be understood that it can be used in combination with a non-carbohydrate polyhydroxy reactant.

In one illustrative embodiment, the binders of the present invention may include (i) uncured resole resin, (ii) an ammonium salt of a polycarboxylic acid, and (iii) a reducing-sugar carbohydrate in an aqueous solution. The latter two reactants are melanoidin reactant compounds (i.e., these reactants produce melanoidins when reacted under conditions to initiate a Maillard reaction). The pH of this solution prior to placing it in contact with the material to be bound can be greater than or equal to about 7. In addition, this solution can have a pH of less than or equal to about 10. The ratio of the number of moles of the polycarboxylic acid reactant to the number of moles of the carbohydrate reactant can be in the range from about 1:4 to about 1:15. In one illustrative variation, the ratio of the number of moles of the polycarboxylic acid reactant to the number of moles of the carbohydrate reactant in the binder composition is about 1:5. In another variation, the ratio of the number of moles of the polycarboxylic acid reactant to the number of moles of the carbohydrate reactant is about 1:6. In another variation, the ratio of the number of moles of the polycarboxylic acid reactant to the number of moles of the carbohydrate reactant is about 1:7.

As described above, the aqueous binder composition may include (i) uncured resole resin, (ii) an ammonium salt of a polycarboxylic acid reactant, and (iii) a carbohydrate reactant having a reducing sugar. It should be appreciated that when an ammonium salt of a monomeric or a polymeric polycarboxylic acid is used as an amine reactant, the molar equivalents of ammonium ion may or may not be equal to the molar equivalents of acid groups present on the polycarboxylic acid. In one illustrative example, an ammonium salt may be monobasic, dibasic, or tribasic when a tricarboxylic acid is used as a polycarboxylic acid reactant. Thus, the molar equivalents of the ammonium ion may be present in an amount less than or about equal to the molar equivalents of acid groups present in a polycarboxylic acid. Accordingly, the ammonium salt can be monobasic or dibasic when the polycarboxylic acid reactant is a dicarboxylic acid. Further, the molar equivalents of ammonium ion may be present in an amount less than, or about equal to, the molar equivalents of acid groups present in a polymeric polycarboxylic acid, and so on and so forth. When a monobasic salt of a dicarboxylic acid is used, or when a dibasic salt of a tricarboxylic acid is used, or when the molar equivalents of ammonium ions are present in an amount less than the molar equivalents of acid groups present in a polymeric polycarboxylic acid, the pH of the binder composition may require adjustment to achieve alkalinity.

The uncured, thermally-curable, alkaline, aqueous binder composition can be used to fabricate a number of different materials. In particular, these binders can be used to produce or promote cohesion in non-assembled or loosely-assembled matter by placing the binder in contact with the matter to be bound. Any number of well known techniques can be employed to place the aqueous binder in contact with the material to be bound. For example, the aqueous binder can be sprayed on (e.g., during the binding glass fibers) or applied via a roll-coat apparatus.

The aqueous binders described herein can be applied to a mat of glass fibers (e.g., sprayed onto the mat) during production of fiberglass insulation products. Once the aqueous binder is in contact with the glass fibers, the residual heat from the glass fibers (note that the glass fibers are made from molten glass and thus contain residual heat) and the flow of air through the fibrous mat will evaporate (i.e., remove) water from the binder. Removing the water leaves the remaining components of the binder on the fibers as a coating of viscous or semi-viscous high-solids liquid. This coating of viscous or semi-viscous high-solids liquid functions as a binder. At this point, the mat has not been cured. In other words, the uncured binder functions to bind the glass fibers in the mat.

It should also be understood that the aqueous binders described herein can be cured, and that drying and curing may occur either sequentially, contemporaneously, or concurrently. For example, any of the above-described aqueous binders can be disposed (e.g., sprayed) on the material to be bound, and then heated. Illustratively, in the case of making certain fiberglass insulation products, after the aqueous binder has been applied to the mat, the binder-coated mat is immediately or eventually transferred to a curing oven (eventual transfer is typical when additional components, such as various types of oversprays and porous glass fiber facings, for example, are added to the binder-coated mat prior to curing). In the curing oven the mat is heated (e.g., from about 300° F. to about 600° F.) and the binder is cured. Alternatively, the mat may be shipped in an uncured state, and then transferred to a curing mold in which heat is applied under pressure to cure the binder. The cured binder is a water-resistant thermoset binder that attaches the glass fibers of the mat together. The mat of fiberglass may be processed to form one of several types of fiberglass materials, such as fiberglass insulation products.

With respect to making binders that are water-resistant thermoset binders when cured, it should be appreciated that the ratio of the number of molar equivalents of acid salt groups present on the polycarboxylic acid reactant to the number of molar equivalents of hydroxyl groups present on the carbohydrate reactant may be in the range from about 0.04:1 to about 0.15:1. After curing, these formulations result in a water-resistant thermoset binder. In one illustrative variation, the number of molar equivalents of hydroxyl groups present on the carbohydrate reactant is about twenty five-fold greater than the number of molar equivalents of acid salt groups present on the polycarboxylic acid reactant. In another variation, the number of molar equivalents of hydroxyl groups present on the carbohydrate reactant is about ten-fold greater than the number of molar equivalents of acid salt groups present on the polycarboxylic acid reactant. In yet another variation, the number of molar equivalents of hydroxyl groups present on the carbohydrate reactant is about six-fold greater than the number of molar equivalents of acid salt groups present on the polycarboxylic acid reactant.

In other illustrative embodiments of the present invention, a binder that is already cured can be disposed on a material to be bound. As indicated above, most cured binders of the present invention will typically contain water-insoluble melanoidins. Accordingly, these binders will also be water-resistant thermoset binders.

As discussed below, various additives can be incorporated into the binder composition. These additives may give the binders of the present invention additional desirable characteristics. For example, the binder typically may include a silicon-containing coupling agent. Many silicon-containing coupling agents are commercially available from the Dow-Corning Corporation, Petrarch Systems, and from the General Electric Company. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (General Electric Silicones, SILQUEST A-1101; Wilton, Conn.; USA). In another variation, the silicon-containing compound is an amino-substituted silane, for example, aminoethylaminopropyltrimethoxy silane (Dow Z-6020; Dow Chemical, Midland, Mich.; USA). In another variation, the silicon-containing compound is gamma-glycidoxypropyltrimethoxysilane (General Electric Silicones, SILQUEST A-187). In yet another variation, the silicon-containing compound is an n-propylamine silane (Creanova (formerly Huls America) HYDROSIL 2627; Creanova; Somerset, N.J.; U.S.A.).

The silicon-containing coupling agents are typically present in the binder in the range from about 0.1 percent to about 1 percent by weight based upon the dissolved binder solids (i.e., about 0.1 percent to about 1 percent based upon the weight of the solids added to the aqueous solution). In one application, one or more of these silicon-containing compounds can be added to the aqueous uncured binder. The binder is then applied to the material to be bound. Thereafter, the binder may be cured if desired. These silicon-containing compounds enhance the ability of the binder to adhere to the matter the binder is disposed on, such as glass fibers. Enhancing the binder's ability to adhere to the matter improves, for example, its ability to produce or promote cohesion in non-assembled or loosely-assembled substances.

A binder of the present invention that includes a silicon-containing coupling agent can be prepared from a polycarboxylic acid reactant and a carbohydrate reactant, the latter having reducing sugar, which reactants are added as solids, mixed into and dissolved in water, treated with aqueous amine base (to neutralize the polycarboxylic acid reactant) and a silicon-containing coupling agent to generate an aqueous solution, which solution is then combined with an aqueous solution of uncured resole resin. Illustratively, a binder that includes a silicon-containing coupling agent can be prepared by admixing an aqueous solution containing a polycarboxylic acid reactant, already neutralized with an amine base or neutralized in situ, and a carbohydrate reactant having reducing sugar, an aqueous solution of uncured resole resin, and an effective amount of a silicon-containing coupling agent, wherein the weight percents of the Maillard and resole reactants are within the range of about 3-50 weight percent.

In another illustrative embodiment, a binder of the present invention may include one or more corrosion inhibitors. These inhibitors may prevent or inhibit the eating or wearing away of a substance, such as metal, caused by chemical decomposition brought about by an acid. When a corrosion inhibitor is included in a binder of the present invention, the binder's corrosivity is decreased as compared to the corrosivity of the binder without the inhibitor present. In another embodiment, these corrosion inhibitors can be utilized to decrease the corrosivity of the glass fiber-containing compositions described herein. Illustratively, corrosion inhibitors may include one or more of the following, a dedusting oil, a monoammonium phosphate, sodium metasilicate pentahydrate, melamine, tin(II)oxalate, and/or methylhydrogen silicone fluid emulsion. When included in a binder of the present invention, corrosion inhibitors are typically present in the binder in the range from about 0.5 percent to about 2 percent by weight based upon the dissolved binder solids.

By following the disclosed guidelines, one of ordinary skill in the art will be able to vary the concentrations of the reactants of the aqueous binder to produce a wide range of binder compositions. In particular, aqueous binder compositions can be formulated to have an alkaline pH. For example, a pH in the range from greater than or equal to about 7 to less than or equal to about 10. Examples of the binder reactants that can be manipulated include (i) the polycarboxylic acid reactant, (ii) the amine base, (iii) the carbohydrate reactant, (iv) the non-carbohydrate polyhydroxy reactant, (v) the resole resin, (vi) the silicon-containing coupling agent, and (vii) the corrosion inhibitor compounds. Having the pH of the aqueous binders (e.g., uncured binders) of the present invention in the alkaline range inhibits the corrosion of materials the binder comes in contact with, such as machines used in the manufacturing process (e.g., in manufacturing fiberglass). Note this is especially true when the corrosivity of acidic binders is compared to binders of the present invention. Accordingly, the "life span" of the machinery increases while the cost of maintaining these machines decreases. Furthermore, standard equipment can be used with the binders of the present invention, rather than having to utilize relatively corrosive resistant machine components that come into contact with acidic binders, such as stainless steel components. Therefore, the binders disclosed herein may decrease the cost of manufacturing bound materials.

The following examples illustrate specific embodiments in further detail. These examples are provided for illustrative purposes only and should not be construed as limiting the invention or the inventive concept to any particular physical configuration in any way.

Example 1

Preparation of Aqueous Triammonium Citrate-Dextrose Binders

Aqueous triammonium citrate-dextrose binders were prepared according to the following procedure: Aqueous solutions (25%) of triammonium citrate (81.9 g citric acid, 203.7 g water, and 114.4 g of a 19% percent solution of ammonia) and dextrose monohydrate (50.0 g of dextrose monohydrate in 150.0 g water) were combined at room temperature in the following proportions by volume: 1:24, 1:12, 1:8, 1:6, 1:5, 1:4, and 1:3, where the relative volume of triammonium citrate is listed as "1." For example, 10 mL of aqueous triammonium citrate mixed with 50 mL of aqueous dextrose monohydrate afforded a "1:5" solution, wherein the mass ratio of triammonium citrate to dextrose monohydrate is about 1:5, the molar ratio of triammonium citrate to dextrose monohydrate is about 1:6, and the ratio of the number of molar equivalents of acid salt groups, present on triammonium citrate, to the number of molar equivalents of hydroxyl groups, present on dextrose monohydrate, is about 0.10:1. The resulting solutions were stirred at room temperature for several minutes, at which time 2-g samples were removed and thermally cured as described in Example 2.

Example 2

Preparation of Cured Triammonium Citrate-Dextrose Binder Samples from Aqueous Triammonium Citrate-Dextrose Binders 2-g samples of each binder, as prepared in Example 1, were placed onto each of three individual 1-g aluminum bake-out pans. Each binder was then subjected to the following three conventional bake-out/cure conditions in pre-heated, thermostatted convection ovens in order to produce the corresponding cured binder sample: 15 minutes at 400° F., 30 minutes at 350° F., and 30 minutes at 300° F.

Example 3

Testing/Evaluation of Cured Triammonium Citrate-Dextrose Binder Samples Produced from Aqueous Triammonium Citrate-Dextrose Binders Wet strength was determined for each cured triammonium citrate-dextrose binder sample, as prepared in Example 2, by the extent to which a cured binder sample appeared to remain intact and resist dissolution, following addition of water to the aluminum bake-out pan and subsequent standing at room temperature. Wet strength was noted as Dissolved (for no wet strength), Partially Dissolved (for minimal wet strength), Softened (for intermediate wet strength), or Impervious (for high wet strength, water-insoluble). The color of the water resulting from its contact with cured ammonium citrate-dextrose binder samples was also determined. Table 1 below shows illustrative examples of triammonium citrate-dextrose binders prepared according to Example 1, curing conditions therefor according to Example 2, and testing and evaluation results according to Example 3.

Example 4

Elemental Analysis of Cured Triammonium Citrate-Dextrose (1:6) Binder Samples

Elemental analyses for carbon, hydrogen, and nitrogen (i.e., C, H, N) were conducted on 5-g samples of 15% triammonium citrate-dextrose (1:6) binder, prepared as described in Example 1 and cured as described below, which 0.75-g cured samples included a molar ratio of triammonium citrate to dextrose monohydrate of about 1:6. Binder samples were cured as a function of temperature and time as follows: 300° F. for 1 hour; 350° F. for 0.5 hour; and 400° F. for 0.33 hour. Elemental analyses were conducted at Galbraith Laboratories, Inc. in Knoxyille, Tenn. As shown in Table 2, elemental analysis revealed an increase in the C:N ratio as a function of increasing temperature over the range from 300° F. to 350° F., which results are consistent with a melanoidin-containing binder having been prepared. Further, an increase in the C:H ratio as a function of increasing temperature is also shown in Table 2, which results are consistent with dehydration, a process known to occur during formation of melanoidins, occurring during binder cure.

Example 5

General Procedure for Preparation of Triammonium Citrate-Dextrose (1:6) Binders General Procedure for Preparation of Ammonium Polycarboxylate-Sugar Binders Aqueous triammonium citrate-dextrose (1:6) binders were prepared by the following general procedure: Powdered dextrose monohydrate (915 g) and powdered anhydrous citric acid (152.5 g) were combined in a 1-gallon reaction vessel to which 880 g of distilled water was added. To this mixture were added 265 g of 19% aqueous ammonia with agitation, and agitation was continued for several minutes to achieve complete dissolution of solids. To the resulting solution were added 3.3 g of SILQUEST A-1101 silane to produce a pH~8-9 solution (using pH paper), which solution contained approximately 50% dissolved dextrose monohydrate and dissolved ammonium citrate solids (as a percentage of total weight of solution); a 2-g sample of this solution, upon thermal curing at 400° F. for 30 minutes, would yield 30% solids (the weight loss being attributed to dehydration during thermoset binder formation). Where a silane other than SILQUEST A-1101 was included in the triammonium citrate-dextrose (1:6) binder, substitutions were made with SILQUEST A-187 Silane, HYDROSIL 2627 Silane, or Z-6020 Silane. When additives were included in the triammonium citrate-dextrose (1:6) binder to produce binder variants, the standard solution was distributed among bottles in 300-g aliquots to which individual additives were then supplied.

When polycarboxylic acids other than citric acid, sugars other than dextrose, and/or additives were used to prepare aqueous ammonium polycarboxylate-sugar binder variants, the same general procedure was used as that described above for preparation of an aqueous triammonium citrate-dextrose (1:6) binder. For ammonium polycarboxylate-sugar binder variants, adjustments were made as necessary to accommodate the inclusion of, for example, a dicarboxylic acid or a polymeric polycarboxylic acid instead of citric acid, or to accommodate the inclusion of, for example, a triose instead of dextrose, or to accommodate the inclusion of, for example, one or more additives. Such adjustments included, for example, adjusting the volume of aqueous ammonia necessary to generate the ammonium salt, adjusting the gram amounts of reactants necessary to achieve a desired molar ratio of ammonium polycarboxylate to sugar, and/or including an additive in a desired weight percent.

Example 6

Preparation of a Composite Triammonium Citrate-Dextrose (1:6)—PFU Resole Binder/Glass Fiber Composition: R-6 and R-8 Flexible Duct Media Powdered dextrose monohydrate (2100 lbs) and powdered anhydrous citric acid (350 lbs) were combined in a 2000-gallon mixing tank that contained 1932 gallons of soft water. To this mixture were added 109.2 gallons of 19% aqueous ammonia under agitation, and agitation was continued for approximately 30 minutes to achieve complete dissolution of solids. To the resulting solution were added 5 gallons of emulsified methylhydrogen silicone (Wacker BS1042) and 5 gallons of emulsified hydroxyl-terminated polydimethylsilane fluid (Basildon Chemical BC 2191), followed by 15 lbs of SILQUEST A-1101 silane. This produced a solution that contained approximately 13.4% dissolved dextrose monohydrate and dissolved ammonium citrate solids (as a percentage of total weight of solution); a 2-g sample of this solution, upon thermal curing at 400° F. for 30 minutes, would yield 8% solids (the weight loss being attributed to dehydration during thermoset binder formation). The solution was stirred for several hours before being transferred to a binder hold tank from which it was used in the manufacture of glass fiber insulation, specifically, in the formation of two different types of a product called flexible duct media (i.e., R-6 flexible duct media and R-8 flexible duct media). This particular Example afforded "transition material," as it was produced in a machine trial/plant run during which a transition was made from (pure) PFU resole binder to (pure) Maillard binder. As such, the Maillard binder became "contaminated" with PFU resole binder, thereby affording a composite triammonium citrate-dextrose (1:6)—PFU resole binder, which binder was used as described below in the preparation of R-6 and R-8 flexible duct media.

Flexible duct media was prepared using conventional fiberglass manufacturing procedures; such procedures are depicted in FIG. 3 and are described generally below. Typically, a binder is applied to glass fibers as they are being produced and formed into a mat, water is volatilized from the binder, and the high-solids binder-coated fibrous glass mat is heated to cure the binder and thereby produce a finished fibrous glass bat which may be used, for example, as a thermal or acoustical insulation product.

A porous mat of fibrous glass was produced by fiberizing molten glass and immediately forming a fibrous glass mat on a moving conveyor. Glass was melted in a tank and supplied to a fiber forming device such as a spinner or a bushing. Fibers of glass were attenuated from the device and then blown generally downwardly within a forming chamber. The glass fibers typically have a diameter from about 2 to about 9 microns and have a length from about 0.25 inch to about 3 inches. Typically, the glass fibers range in diameter from about 3 to about 6 microns, and have a length from about 0.5 inch to about 1.5 inches. The glass fibers were deposited onto a perforated, endless forming conveyor. A binder was applied to the glass fibers, as they were being formed, by means of suitable spray applicators so as to result in a distribution of the binder throughout the formed mat of fibrous glass. The glass fibers, having the uncured binder adhered thereto, were gathered and formed into a mat on the endless conveyor within the forming chamber with the aid of a vacuum drawn through the mat from below the forming conveyor. The residual heat contained in the glass fibers as well as the air flow through the mat caused a majority of the water to volatilize from the mat before it exited the forming chamber. (Water was removed to the extent the uncured binder functioned as a binder; the amount of water to be removed for any particular application can be determined buy one of ordinary skill in the art with routine experimentation)

As the high-solids binder-coated fibrous glass mat emerged from the forming chamber, it expanded vertically due to the resiliency of the glass fibers. The expanded mat was then conveyed to and through a curing oven wherein heated air is passed through the mat to cure the binder. Flights above and below the mat slightly compressed the mat to give the finished product a predetermined thickness and surface finish. As mentioned above, one exemplary way of obtaining a desired thickness is to compress the mat by utilizing the afore-mentioned flights. Since thickness is related to density, a desired density may be achieved by compressing the mat utilizing the afore-mentioned flights. Another exemplary way of obtaining a desired density is by altering the amount of glass fibers per unit volume. Fiber size can be manipulated by adjusting the fiber forming device (e.g., a spinner or a bushing) in a well-known manner to obtain a desired fiber size. Further, binder content can be adjusted by increasing or decreasing the concentration (i.e., the percent solids) of liquid binder, and/or by increasing or decreasing the volume of binder that is sprayed onto glass fibers. Density, fiber size, and/or binder content may be varied to produce a particular insulation product with desired thermal and acoustical properties.

Typically, the curing oven was operated at a temperature over a range from about 350° F. to about 600° F. Generally, the mat resided within the oven for a period of time from about 0.5 minute to about 3 minutes. For the manufacture of conventional thermal or acoustical insulation products, the time ranges from about 0.75 minute to about 1.5 minutes. The fibrous glass having a cured, rigid binder matrix emerged from the oven in the form of a bat which may be compressed for packaging and shipping and which will thereafter substantially recover its as-made vertical dimension when unconstrained. By way of example, a fibrous glass mat which is about 1.25 inches thick as it exits from the forming chamber, will expand to a vertical thickness of about 9 inches in the transfer zone, and will be slightly compressed to a vertical thickness of about 6 inches in the curing oven.

Nominal specifications were as follows for the R-6 and R-8 flexible duct media products: about 0.115 pound per square foot weight and about 0.15 pound per square foot weight, about 0.69 pound per cubic foot density in both cases, target recoveries of 2 inches and 2.625 inches thick after packaging, with a fiber diameter of 20 hundred thousandths of an inch (5.08 microns), 6.3% loss on ignition (without mineral oil), and 0.7% mineral oil content for dedusting (dedusting oil). Curing oven temperature was set at about 450° F. Product exited the oven brown in apparent color and well bonded.

Example 7

Testing/Evaluation of Composite Triammonium Citrate-Dextrose (1:6)—PFU Resole Binder/Glass Fiber Composition: R-6 and R-8 Flexible Duct Media The composite triammonium citrate-dextrose (1:6)—PFU resole binder/glass fiber composition from Example 6, i.e., R-6 and R-8 flexible duct media, was tested versus a corresponding phenol-formaldehyde (PF) binder/glass fiber composition for the following: loss on ignition, thickness recovery, dust, tensile strength, parting strength, durability of parting strength, and corrosivity on steel. The results of these tests are shown in Tables 3-4. Specific tests conducted and conditions for performing these tests are as follows:
Loss on Ignition (LOI)
The loss on ignition for flexible duct media from Example 6 was determined in accordance with internal test method K-157, "Ignition Loss of Cured Blanket (LOI)." The test was performed on a sample in a wire tray placed in a furnace at 1000° F., +/−50° F., for 15 to 20 minutes to ensure complete oxidation, after which treatment the resulting sample was weighed.
Parting Strength
The parting strength of flexible duct media from Example 6 was determined in accordance with internal test method KRD-161, which test method is virtually identical to ASTM C 686, "Parting Strength of Mineral Fiber Batt and Blanket-Type Insulation."
Durability of Parting Strength
The durability of parting strength for flexible duct media from Example 6 was determined in accordance with ASTM C 686, "Parting Strength of Mineral Fiber Batt and Blanket-Type Insulation," following one-week conditioning at 90° F. and 95% relative humidity.
Tensile Strength
The tensile strength of flexible duct media from Example 6 was determined in accordance with an internal test method KRD-165, "Tensile Strength Test Procedure." The test was performed on samples die cut in both the machine direction and the cross-cut machine direction. Samples were conditioned for 24 hours at 75° F. and 50% relative humidity. Ten samples in each machine direction were tested in a test environment of 75° F., 50% relative humidity. The dogbone specimen was as specified in ASTM D638, "Standard Test Method for Tensile Properties of Plastics." A cross-head speed of 2 inches/minute was used for all tests.
Thickness Recovery
Thickness recovery tests were performed on flexible duct media from Example 6 using internal test methods K-120, "Test Procedure for Determining End-of-Line Dead-Pin Thickness—Batts," and K-128, "Test Procedure for Recovered Thickness of Batt Products—Drop Method," both of which test methods are similar to ASTM C 167, "Standard Test Methods for Thickness and Density of Blanket or Batt Thermal Insulations."
Dust Testing
Dust testing was performed on flexible duct media from Example 6 using internal test procedure K-102, "Packaged Fiber Glass Dust Test, Batt Method." Dust liberated from randomly selected samples (batts) of cured blanket, R30 residential blanket, and R19 residential blanket dropped into a dust collection box was collected on a filter and the amount of dust determined by difference weighing.

Corrosivity on Steel

Corrosivity testing was performed on flexible duct media from Example 6 versus steel coupons using internal test procedure Knauf PTL-14, which is virtually identical to ASTM C 665.

TABLE 1

Testing/Evaluation Results for Cured Triammonium citrate-Dextrose Binder Samples[a]

| BINDER COMPOSITION Triammonium citrate[b]:Dextrose•$H_2O$[c] | | | Wet Strength | Water Color | Wet Strength | Water Color | Wet Strength | Water Color |
|---|---|---|---|---|---|---|---|---|
| Mass Ratio | Mole Ratio[d] | COOH:OH Ratio[d] | (400° F.) | (400° F.) | (350° F.) | (350° F.) | (300° F.) | (300° F.) |
| 1:24 | (1:30) | 0.02:1 | Dissolved | Light caramel-colored | Dissolved | Light caramel-colored | Dissolved | Light caramel-colored |
| 1:12 | (1:15) | 0.04:1 | Impervious | Clear and colorless | Dissolved | Caramel-colored | Dissolved | Caramel-colored |
| 1:8 | (1:10) | 0.06:1 | Impervious | Clear and colorless | Partially Dissolved | Caramel-colored | Dissolved | Caramel-colored |
| 1:6 | (1:7) | 0.08:1 | Impervious | Clear and colorless | Softened | Clear yellow | Dissolved | Caramel-colored |
| 1:5 | (1:6) | 0.10:1 | Impervious | Clear and colorless | Softened | Clear yellow | Dissolved | Caramel-colored |
| 1:4[e] | (1:5)[e] | 0.12:1[e] | Impervious | Clear and colorless | Softened | Clear yellow | Dissolved | Caramel-colored |
| 1:3[e] | (1:4)[e] | 0.15:1[e] | Impervious | Clear and colorless | Softened | Clear orange | Dissolved | Caramel-colored |

[a]From Example 1
[b]MW = 243 g/mol; 25% (weight percent) solution
[c]MW = 198 g/mol; 25% (weight percent) solution
[d]Approximate
[e]Associated with distinct ammonia smell

TABLE 2

Elemental Analysis Results for Cured Triammonium Citrate-Dextrose (1:6) Binder Samples[a] as a Function of Temperature and Time

| Cure Temp | Cure Time | Elemental Analysis | Elemental Analysis Results | | C:H | C:N |
|---|---|---|---|---|---|---|
| 300° F. | 1 hour | Carbon | 48.75% | | 8.70 | 11.89 |
| | | Hydrogen | 5.60% | | | |
| | | Nitrogen | 4.10% | | | |
| 300° F. | 1 hour | Carbon | 49.47% | | 8.91 | 12.00 |
| | | Hydrogen | 5.55% | | | |
| | | Nitrogen | 4.12% | | | |
| 300° F. | 1 hour | Carbon | 50.35% | | 9.31 | 12.04 |
| | | Hydrogen | 5.41% | Avg: -- | 8.97 | 11.98 |
| | | Nitrogen | 4.18% | | | |
| 350° F. | 0.5 hour | Carbon | 52.55% | | 10.10 | 12.36 |
| | | Hydrogen | 5.20% | | | |
| | | Nitrogen | 4.25% | | | |
| 350° F. | 0.5 hour | Carbon | 54.19% | | 10.67 | 12.31 |
| | | Hydrogen | 5.08% | | | |
| | | Nitrogen | 4.40% | | | |
| 350° F. | 0.5 hour | Carbon | 52.86% | | 10.22 | 12.47 |
| | | Hydrogen | 5.17% | Avg: -- | 10.33 | 12.38 |
| | | Nitrogen | 4.24% | | | |
| 400° F. | 0.33 hour | Carbon | 54.35% | | 10.68 | 12.21 |
| | | Hydrogen | 5.09% | | | |
| | | Nitrogen | 4.45% | | | |
| 400° F. | 0.33 hour | Carbon | 55.63% | | 10.99 | 12.15 |
| | | Hydrogen | 5.06% | | | |
| | | Nitrogen | 4.58% | | | |
| 400° F. | 0.33 hour | Carbon | 56.10% | | 11.47 | 12.06 |
| | | Hydrogen | 4.89% | Avg: -- | 11.05 | 12.14 |
| | | Nitrogen | 4.65% | | | |

[a]From Example 4

TABLE 3

Testing Results for R-6 Flexible Duct Media from Example 6: Composite Triammonium citrate-Dextrose (1:6) - PFU Resole Binder vs. Standard PF Resole Binder

| TEST | | Composite Binder-Fiberglass Flexible Duct Media "COMPOSITE" | PF Binder-Fiberglass Flexible Duct Media "STANDARD" | COMPOSITE % of STANDARD |
|---|---|---|---|---|
| Thickness Recovery (dead, in.): | 1 week | 1.83 | 1.79 | 102% |
| | 3 week | 1.96 | 1.75 | 112% |

TABLE 3-continued

Testing Results for R-6 Flexible Duct Media from
Example 6: Composite Triammonium citrate-Dextrose
(1:6) - PFU Resole Binder vs. Standard PF Resole Binder

| TEST | | Composite Binder-Fiberglass Flexible Duct Media "COMPOSITE" | PF Binder-Fiberglass Flexible Duct Media "STANDARD" | COMPOSITE % of STANDARD |
|---|---|---|---|---|
| | 6 week | 1.88 | 1.69 | 111% |
| | 3 month | — | — | — |
| Thickness Recovery (drop, in.): | 1 week | 2.19 | 2.05 | 107% |
| | 3 week | 2.20 | 2.01 | 109% |
| | 6 week | 2.14 | 1.95 | 110% |
| | 3 month | — | — | — |
| Dust (mg) | | 0.0095 | 0.0070 | 136% |
| Tensile Strength (lb/in. width) | | | | |
| Machine Direction | | — | — | — |
| Cross Machine Dir. | | — | — | — |
| Average | | 32.31 | 34.31 | 94% |
| Parting Strength (g/g) | | | | |
| Machine Direction | | 291.36 | 356.19 | 82% |
| Cross Machine Direction | | 286.58 | 331.78 | 86% |
| Average | | 288.97 | 343.99 | 84% |
| Durability of Parting Strength (g/g) | | | | |
| Machine Direction | | 252.34 | 355.03 | 71% |
| Cross Machine Direction | | 294.72 | 337.47 | 87% |
| Average | | 273.53 | 346.25 | 79% |
| Loss on Ignition (%) | | 5.9% | 7.39% | 80% |
| Corrosion (steel) | | Pass | Pass | — |

TABLE 4

Testing Results for R-8 Flexible Duct Media from
Example 6: Composite Triammonium citrate-Dextrose
(1:6) - PFU Resole Binder vs. Standard PF Resole Binder

| TEST | | Composite Binder-Fiberglass Flexible Duct Media "COMPOSITE" | PF Binder-Fiberglass Flexible Duct Media "STANDARD" | COMPOSITE % of STANDARD |
|---|---|---|---|---|
| Thickness Recovery (dead, in.): | 1 week | 2.50 | 1.79 | 140% |
| | 3 week | 2.24 | 1.75 | 128% |
| | 6 week | 2.16 | 1.69 | 128% |
| | 3 month | — | — | — |
| Thickness Recovery (drop, in.): | 1 week | 2.70 | 2.05 | 132% |
| | 3 week | 2.58 | 2.01 | 128% |
| | 6 week | 2.56 | 1.95 | 131% |
| | 3 month | — | — | — |
| Dust (mg) | | 0.0125 | 0.0070 | 178% |
| Tensile Strength (lb/in. width) | | | | |
| Machine Direction | | — | — | — |
| Cross Machine Dir. | | — | — | — |
| Average | | 34.11 | 34.31 | 99% |
| Parting Strength (g/g) | | | | |
| Machine Direction | | 308.83 | 356.19 | 87% |
| Cross Machine Direction | | 280.42 | 331.78 | 84% |
| Average | | 294.63 | 343.99 | 86% |
| Durability of Parting Strength (g/g) | | | | |
| Machine Direction | | 285.21 | 355.03 | 80% |
| Cross Machine Direction | | 270.09 | 337.47 | 80% |
| Average | | 277.65 | 346.25 | 80% |

TABLE 4-continued

Testing Results for R-8 Flexible Duct Media from
Example 6: Composite Triammonium citrate-Dextrose
(1:6) - PFU Resole Binder vs. Standard PF Resole Binder

| TEST | Composite Binder-Fiberglass Flexible Duct Media "COMPOSITE" | PF Binder-Fiberglass Flexible Duct Media "STANDARD" | COMPOSITE % of STANDARD |
|---|---|---|---|
| Loss on Ignition (%) | 6.2% | 7.39% | 84% |
| Corrosion (steel) | Pass | Pass | — |

While certain embodiments of the present invention have been described and/or exemplified above, it is contemplated that considerable variation and modification thereof are possible. Accordingly, the present invention is not limited to the particular embodiments described and/or exemplified herein.

The invention claimed is:

1. A method of manufacturing a collection of matter held together by a binder, the method comprising:
preparing an aqueous solution comprising an uncured resole resin, a carbohydrate reactant, and an amine reactant, where the carbohydrate and the amine reactants are Maillard reactants,
disposing the aqueous solution onto a collection of matter,
volatilizing water to form a dehydrated reactive mixture as an uncured binder disposed upon the collection of matter, and
curing the dehydrated reactive mixture to form an infusible polymeric product, wherein the infusible polymeric product is the binder that promotes cohesion of the collection of matter, and
wherein the Maillard reactants comprise (a) a monosaccharide; and (b) an ammonium salt of a polycarboxylic acid, and wherein the ratio of the number of moles of the ammonium salt to the number of moles of the monosaccharide is in the range from 1:4 to 1:15.

2. The method of claim 1, wherein the preparing step includes adjusting the aqueous solution to an alkaline pH.

3. The method of claim 1, further comprising mixing urea with an aldehyde and phenol to form the uncured resole resin, wherein the urea, the aldehyde, and the phenol are mixed for a time sufficient to afford the aldehyde in a concentration of less than about 0.5%, on a wet basis.

4. The method of claim 1, wherein the collection of matter includes fibers selected from the group consisting of mineral fibers, aramid fibers, ceramic fibers, metal fibers, carbon fibers, polyimide fibers, polyester fibers, rayon fibers, mineral wool, glass fibers, and cellulosic fibers.

5. The method of claim 1, wherein the carbohydrate reactant is selected from one or more reducing sugars, one or more carbohydrate reactants that yield one or more reducing sugars in situ under thermal curing conditions, and combinations thereof.

6. The method of claim 1, wherein the carbohydrate reactant comprises dextrose.

7. The method of claim 1, wherein the amine reactant is selected from the group consisting of an ammonium salt of a polycarboxylic acid, an amino acid, a peptide, a protein, and mixtures thereof.

8. The method of claim 1, wherein the aqueous solution further comprises a silicon-containing compound selected from the group consisting of gamma-aminopropyltriethoxysilane, gamma-glycidoxypropyltrimethoxysilane, aminoethylaminopropyltrimethoxysilane, n-propylamine silane, and mixtures thereof.

9. The method of claim 1, wherein the aqueous solution further comprises a corrosion inhibitor selected from the group consisting of dedusting oil, monoammonium phosphate, sodium metasilicate pentahydrate, melamine, tin(II) oxalate, and a methylhydrogen silicone fluid emulsion.

10. The method of claim 1, wherein the Maillard reactants upon thermal curing produce melanoidins.

11. The method of claim 1, wherein a predominant mole fraction of the uncured binder is represented by the uncured resole resin.

12. The method of claim 1, wherein a predominant mole fraction of the uncured binder is represented by the Maillard reactants.

13. The method of claim 1, wherein the uncured resole resin and the Maillard reactants are present in the uncured binder in about equal mole fractions.

14. The method of claim 1, in which the collection of matter is a fiberglass insulation product comprising fibers selected from mineral fibers and glass fibers.

15. The method of claim 1, in which the collection of matter is a wood fiber board product.

* * * * *